US012614931B2

(12) United States Patent
Sun

(10) Patent No.: US 12,614,931 B2
(45) Date of Patent: Apr. 28, 2026

(54) INSULATING FRAMEWORK, STATOR, MOTOR, COMPRESSOR, AND VEHICLE

(71) Applicants: ANHUI WELLING AUTO PARTS CO., LTD., Hefei (CN); GUANGDONG WELLING AUTO PARTS CO., LTD., Foshan (CN)

(72) Inventor: Guowei Sun, Hefei (CN)

(73) Assignees: ANHUI WELLING AUTO PARTS CO., LTD., Hefei (CN); GUANGDONG WELLING AUTO PARTS CO., LTD., Foshan (CN)

(*) Notice: Subject to any disclaimer, the term of this patent is extended or adjusted under 35 U.S.C. 154(b) by 275 days.

(21) Appl. No.: 18/372,289

(22) Filed: Sep. 25, 2023

(65) Prior Publication Data

US 2024/0014697 A1    Jan. 11, 2024

Related U.S. Application Data

(63) Continuation of application No. PCT/CN2022/090521, filed on Apr. 29, 2022.

(30) Foreign Application Priority Data

May 17, 2021    (CN) .......................... 202110534784.6
May 17, 2021    (CN) .......................... 202110536646.1
(Continued)

(51) Int. Cl.
*H02K 1/16* (2006.01)
*H02K 3/12* (2006.01)
*H02K 5/00* (2006.01)

(52) U.S. Cl.
CPC ................. *H02K 1/16* (2013.01); *H02K 3/12* (2013.01); *H02K 5/00* (2013.01)

(58) Field of Classification Search
CPC H02K 3/32; H02K 3/325; H02K 3/34; H02K 3/345; H02K 3/38; H02K 3/50; H02K 2203/12
(Continued)

(56) References Cited

U.S. PATENT DOCUMENTS 9,722,466 B2 * 8/2017 Tsuiki ...................... H02K 3/18
2006/0022550 A1 2/2006 Otsuji
(Continued)

FOREIGN PATENT DOCUMENTS

CN 105099018 A 11/2015
CN 210246415 U 4/2020
(Continued)

OTHER PUBLICATIONS

JP-2020162300-A machine translation (Year: 2020).*
(Continued)

*Primary Examiner* — Oluseye Iwarere
*Assistant Examiner* — Minki Chang
(74) *Attorney, Agent, or Firm* — Scully, Scott, Murphy & Presser, P.C.

(57) ABSTRACT

An insulating framework, a stator, a motor, a compressor and a vehicle are provided. The insulating framework has a first support, a second support and a third support. The second support is disposed opposite to the first support and is provided with a wire slot. The wire slot passes through the wall surface of the second support. A portion of the bottom wall of the wire slot inclines towards the bottom of the second support to form an inclined portion. The inclined portion is located on the side of the wire slot facing the first support. The third support is located between the first support and the second support and connected to the first support and the second support.

31 Claims, 6 Drawing Sheets

(30) Foreign Application Priority Data

May 17, 2021    (CN) .......................... 202121051945.8
May 17, 2021    (CN) .......................... 202121052696.4

(58) Field of Classification Search
USPC ...................................... 310/49.13, 216.105
See application file for complete search history.

(56) References Cited

U.S. PATENT DOCUMENTS

| | | |
|---|---|---|
| 2014/0327336 A1 | 11/2014 | Ewert et al. |
| 2018/0076673 A1 | 3/2018 | Kazama et al. |
| 2020/0106332 A1 | 4/2020 | Iguchi |
| 2020/0153307 A1* | 5/2020 | Abdallah ............... H02K 3/522 |
| 2021/0050757 A1 | 2/2021 | Kitano et al. |

FOREIGN PATENT DOCUMENTS

| | | |
|---|---|---|
| CN | 210431061 U | 4/2020 |
| CN | 211701661 U | 10/2020 |
| CN | 112564326 A | 3/2021 |
| CN | 113300519 A | 8/2021 |
| CN | 113300520 A | 8/2021 |
| CN | 215835218 U | 2/2022 |
| CN | 216121982 U | 3/2022 |
| JP | 2001314055 A | 11/2001 |
| JP | 2012125057 A | 6/2012 |
| JP | 2012152023 A | 8/2012 |
| JP | 2014011945 A | 1/2014 |
| JP | 2015084629 A | 4/2015 |
| JP | 2015220880 A | 12/2015 |
| JP | 2018027001 A | 2/2018 |
| JP | 2020162300 A * | 10/2020 |
| WO | 2012127658 A1 | 9/2012 |

OTHER PUBLICATIONS

Notice of Reasons for Refusal dated Sep. 17, 2024 received in Japanese Patent Application No. 2023-542782.

Extended European search report dated Jul. 18, 2024 received in European Patent Application No. 22803778.4.

International Search Report dated Jun. 23, 2022 issued in PCT/CN2022/090521.

First Office Action dated Mar. 6, 2025 received in Chinese Patent Application No. 202110534784.6.

First Office Action dated Feb. 28, 2025 received in Chinese Patent Application No. 202110536646.1.

* cited by examiner

INSULATING FRAMEWORK, STATOR, MOTOR, COMPRESSOR, AND VEHICLE

CROSS REFERENCE TO RELATED APPLICATIONS

This application is a continuation application of PCT International Patent Application No. PCT/CN2022/090521, filed on Apr. 29, 2022, which claims priority to and benefits of Chinese Patent Application No. 202110536646.1, Chinese Patent Application No. 202121052696.4, Chinese Patent Application No. 202110534784.6 and Chinese Patent Application No. 202121051945.8, the entire contents of each of which are herein incorporated by reference for all purposes. No new matter has been introduced.

FIELD

The present disclosure relates to the field of compressors, and particularly relates to an insulating framework, a stator, a motor, a compressor, and a vehicle.

BACKGROUND

Currently, a motor comprises a stator and a rotor, and the rotor and the stator construct a laminated core, and a coil is made by winding around each individual too thin a stator groove. Generally, the coil is wound around a stator core, and an insulating framework for insulating the coil is provided between the stator core and the coil.

In order to reduce the volume of a compressor and improve the operating range of the compressor, the motor not only needs to achieve high power density, but further has to lower the height of the core as much as possible under the same output power; meanwhile, for the coil of the motor, the winding of the coil around the insulating framework needs to be as compact as possible to improve the slot fill factor of the stator. However, for an insulating framework in the related art, when the lead of the coil is fixed, the insulating framework does not have a corresponding structural portion for conducting effective locking, and thus the fixing performance of the coil is lowered.

SUMMARY

The present disclosure aims to solve at least one of the problems that exist in the prior art or related art.

Thus, a first aspect of the present disclosure proposes an insulating framework.

A second aspect of the present disclosure further proposes a stator.

A third aspect of the present disclosure further proposes a motor.

A fourth aspect of the present disclosure further proposes a compressor.

A fifth aspect of the present disclosure further proposes a vehicle.

A sixth aspect of the present disclosure proposes an insulating framework.

A seventh aspect of the present disclosure further proposes a stator.

An eighth aspect of the present disclosure further proposes a motor.

A ninth aspect of the present disclosure further proposes a compressor.

A tenth aspect of the present disclosure further proposes a vehicle.

In view of this, the first aspect of the present disclosure proposes an insulating framework, including: a first support; a second support disposed opposite to the first support, and the second support is provided with a wire slot, the wire slot passes through the wall surface of the second support, a portion of the bottom wall of the wire slot inclines towards the bottom of the second support to form an inclined portion, and the inclined portion is located on the side of the wire slot facing the first support; and a third support, located between the first support and the second support and connected to the first support and the second support.

The insulating framework proposed by the present disclosure comprises the first support, the second support and the third support, the second support and the first support are distributed opposite to each other, and the third support is provided between the first support and the second support; moreover, one end of the third support is connected with the first support, and the other end of the third support is connected with the second support, so that the first support, the second support and the third support are connected integrally. And the second support is provided with a wire slot, the wire slot comprises a bottom wall, the bottom wall of the wire slot inclines towards the bottom of the second support to form an inclined portion arranged inclinedly, and the inclined portion is located at a side close to the first support, and thus, when a wire is wound by the insulating framework, a coil extends into the wire slot from the side of the wire slot away from the first support and thus extends along the inclined portion to the bottom of the first support, so that winding of the coil is facilitated; meanwhile, the wire slot can pre-fix the coil, so that the winding of the coil is more compact, the fixing performance of the coil is improved, and the slot fill factor of a stator core is improved.

The insulating framework can be used in the stator, the stator comprises a stator core, a coil and the above insulating framework; and the insulating framework is provided at the two ends of the stator core in the axial direction, and the coil is wound around the insulating framework and the stator core. A winding accommodating portion is enclosed by the first support, the second support and the third support for accommodating the coil, the stator core inlets wire through the wire slot, so that the coil inclines downwards along the inclined portion and the winding of the coil is more compact.

In an embodiment, the first support, the second support and the third support are formed integrally.

It can be understood that the wire slot comprises an opening and a bottom wall disposed opposite to the opening, a portion of the bottom wall of the wire slot inclines towards the bottom direction of the second support to form the inclined portion; moreover, the inclined portion is provided at the side of the wire slot facing the first support, i.e., the inclined portion is provided at the inner side of the first support. That is, the upper half portion of the wire slot approximately presents a U shape, the opening is located in the U-shaped top, the lower half portion of the wire slot presents a sloping shape, so that the coil is more compact when the wire crosses, and the fixing performance of the winding of the coil is improved.

In an embodiment, when the insulating framework is used in the stator, the first support is close to the inner side of the stator core, the second support is close to the outer side of the stator core, and the third support is connected with and located between the first support and the second support.

The above insulating framework provided in the present disclosure can further comprise the following additional features.

In the above embodiment, furthermore, the insulating framework further comprises a terminal accommodating portion, the terminal accommodating portion is provided at the side of the second support away from the first support and is used for accommodating a crimp terminal, and along a first direction, the terminal accommodating portion is located at the first side of the wire slot.

In the embodiment, the insulating framework further comprises the terminal accommodating portion, the terminal accommodating portion is provided on the second support, the crimp terminal is provided inside the terminal accommodating portion, in-phase coils are connected inside the terminal accommodating portion through the crimp terminal, so that the in-phase coils are in series connection. And the terminal accommodating portion is provided at the side of the second support away from the first support, and thus this avoids occupying the winding space of the coils. Meanwhile, the terminal accommodating portion and the wire slot are distributed along the first direction, and this facilitates the winding of the coils and the series connection of the in-phase coils. In addition, through disposing a terminal accommodating groove in the insulating framework, other in-phase structures in electrical connection are prevented from being stacked on the insulating framework, and the integral dimension of the stator is further reduced.

The first direction is the circumferential direction of the stator core.

In any of the above embodiments, furthermore, the terminal accommodating portion further comprises: an accommodating groove for accommodating the crimp terminal, and a notch is provided in the accommodating groove, and the notch is located in the side wall of the accommodating groove along the first direction; a glue overflow groove, and along the first direction, the glue overflow groove is located at the two sides of the accommodating groove, and the glue overflow groove is in communication with the notch.

In the embodiment, the terminal accommodating portion comprises the accommodating groove and the glue overflow groove, the accommodating groove is used for accommodating the crimp terminal of the stator, and the notch is provided in the accommodating groove, the wire head and the wire tail of in-phase coils extend into the accommodating groove through the notch at one side of the accommodating groove, which plays the role of positioning the coils and ensures the stability of the coils, and meanwhile, the electrical connection of the in-phase coils is achieved through the crimp terminal.

In addition, the glue overflow groove is provided at the two sides of the accommodating groove and is in communication with the notch, and thus, after the in-phase coils are electrically connected through a connecting terminal, the coils are sealed through a sealant at the accommodating groove and the notch, and this improves the safety performance of the coils, and moreover, due to the arrangement of the glue overflow groove, in the process of using the sealant to seal the crimp terminal, redundant sealant will be blocked by the glue overflow groove, so that the sealant will not overflow to the outer side of the terminal accommodating portion, to achieve relatively good sealing for the coils.

Two notches can be provided in the accommodating groove, the two notches are respectively provided in the two side walls of the accommodating groove in the first direction. Likewise, the number of the glue overflow grooves is two, and the two glue overflow grooves are respectively provided corresponding to the two notches, so that the overflow of the sealant at the two notches can be prevented through the glue overflow grooves when sealing is conducted at the two notches.

It can be understood that when the crimp terminal and the cut section of a conducting wire are sealed, if a sealant with a low viscosity is used, the sealant can easily flow away along the side wall of the accommodating groove, and thus it is difficult to achieve complete sealing to the crimp terminal and the cut section of the conducting wire. If a sealant with a high viscosity is used, as the flowability of the sealant is not high and the notches of the accommodating groove are relatively narrow, it is difficult to cover them completely. Therefore, through disposing the glue overflow grooves according to the present disclosure, the overflow of the sealant is prevented, and the complete sealing to the crimp terminal and the cut section of the conducting wire of the coil is achieved.

In any of the above embodiments, furthermore, the terminal accommodating portion further comprises: a glue overflow table, and the glue overflow table is provided at the two sides of the accommodating groove along the first direction; and a lug boss, provided on the glue overflow table, and the glue overflow groove is enclosed at least by the lug boss and the glue overflow table.

In the embodiment, the terminal accommodating portion further comprises the glue overflow table and the lug boss, the glue overflow table is provided at the two sides of the accommodating groove, i.e., a protruding glue overflow table is provided at the two sides of the accommodating groove in the first direction, and the lug boss is provided on the glue overflow table, so that the glue overflow groove is enclosed at least by the glue overflow table and the lug boss, and thus at least a portion of the notches are surrounded by the glue overflow groove, and furthermore redundant sealant can flow into the glue overflow groove when the sealant is poured into the accommodating groove and the notches for sealing, and then the sealant is prevented from overflowing the terminal accommodating portion.

It can be understood that the crimp terminal pierces the coils so that the in-phase coils are connected.

The crimp terminal can be a piercing terminal, and thus the crimp terminal can pierce the insulating coating on the surface of the coils in the process of compressing the coils within the accommodating groove, to achieve the electrical connection of the in-phase coils and thus achieving rapid connection.

In any of the above embodiments, furthermore, the lug boss comprises: a first bump, provided at the side of the accommodating groove away from the wire slot, and the first bump is located at the side of the notch away from the first support; and a second bump, provided at the side of the accommodating groove close to the wire slot, and the glue overflow groove is enclosed by the second bump, the second support and the accommodating groove, and a gap is provided between the second bump and the accommodating groove.

In the embodiment, the lug boss comprises the first bump and the second bump, and the first bump and the second bump are respectively provided on the glue overflow tables on the two sides of the accommodating groove, and the first bump is located at the side of the accommodating groove away from the wire slot, and located at the side of the notch away from the first support, and thus, the redundant sealant can be blocked by the first bump when the sealant is poured into the accommodating groove and the notches, to avoid the overflow of the sealant.

The second bump is provided at the side of the accommodating groove close to the wire slot, and the glue overflow groove is enclosed by the second bump, the surface of the second support and the outer sidewall surface of the accommodating groove, and the end portion of the second bump and the wall surface of the accommodating groove are not completely closed therebetween and have a gap, and this helps the cutting and sealing of the wire tail of the coil.

For example, a wiring channel is provided in the bottom of the first bump, the wiring channel is disposed opposite to the notches, so that the coil can be further fixed in the wiring channel, to improve the fixing performance of the coil.

In addition, the dimension of the gap is relatively small, which prevents the sealant from flowing out. In an embodiment, the width of the gap is greater than or equal to 1 mm, and is less than or equal to 5 mm.

In any of the above embodiments, furthermore, the notch comprises a first channel and a second channel which are in communication, the first channel is located on the top of the second channel, and the side wall of the first channel is provided gradually expanding towards the two sides of the first channel.

In the embodiment, the notch comprises the first channel and the second channel which are in communication, i.e., the notch is divided into an upper half portion and a lower half portion, and the first channel is located at the upper half portion, the second channel is located at the lower half portion, and the upper half portion is in communication with the lower half portion, and the side wall of the first channel is arranged expanding gradually to help pass the wire at the notch; meanwhile, the inclining arrangement of the upper half portion of the notch can further help the pouring of the sealant, so that the sealant can flow towards the bottom of the notch along the wall surface arranged inclinedly, to improve the sealing effect of the sealant to the cut section of the coil.

For example, the notch approximately presents a U shape, the side wall of the first channel presents a sloping shape, the side wall of the second channel is approximately straight.

In any of the above embodiments, furthermore, the width of the wire slot is greater than that of the notch.

In the embodiment, both the wire head and the wire tail of the coil are provided in the notch, which helps the coil enter into the groove, the width of the wire slot is greater than that of the notch, so that the wire head and the wire tail are in more compact connection with the notch when entering into the notch, to improve the fixing performance of the notch to the coil.

For example, the width of the wire slot is further the width of the wire slot along the first direction, and the width of the notch is further the width of the notch along a second direction. In an embodiment, both the wire slot and the notch approximately present a U shape, and the width of the wire slot and the width of the notch are further the distance between the U-shaped side walls at the left and right sides.

Through the above arrangement of the widths of the notch and the wire slot, on the one hand, the notch can accommodate both the wire head and the wire tail of the coil at the same time, and on the other hand can improve the tightness of the coil.

In any of the above embodiments, furthermore, the insulating framework further comprises a protruding portion, provided at the side of the second support away from the first support, and along the first direction, the protruding portion is located at a second side of the wire slot.

In the embodiment, the insulating framework further comprises the protruding portion, the protruding portion is provided on the second support and located at the side of the second support away from the first support and the third support; the protruding portion, the wire slot and the terminal accommodating portion are arranged sequentially along the first direction, and the arrangement of the protruding portion can play the role of limiting the coil, and preventing the coil from escaping; and in an embodiment, the arrangement of the protruding portion can prevent the escaping of the wire tail of the coil and improve the fixing performance of the coil.

In an embodiment, for block cores, each block core is wound with a coil, each coil comprises a wire head and a wire tail, and after accomplishing the winding, the wire tail extends into the wire slot through the bottom of the protruding portion, and the coil is limited through the wire slot.

It can be understood that along the first direction, the wire slot comprises a first side and a second side; the first side of the wire slot and the second side of the wire slot are two sides of the wire slot disposed opposite to each other, and the side of the wire slot close to the terminal accommodating portion is the first side of the wire slot, and the side of the wire slot close to the protruding portion is the second side of the wire slot.

In any of the above embodiments, furthermore, at least a portion of the top wall of the protruding portion inclines towards the bottom of the second support.

In the embodiment, at least a portion of the top wall of the protruding portion inclines towards the bottom of the second support, on the one hand, it decreases the materials used by the protruding portion and reduces the production cost, and on the other hand, it prevents the interference to other structures when the insulating framework is used in cooperation with other structures.

For example, the cross section of the protruding portion approximately presents a triangular shape.

The motor can comprise the stator core, the insulating framework and an insulating cover plate; the insulating framework is provided at the two ends of the stator core, and the insulating cover plate is provided at the two ends of the insulating framework away from the stator core. The insulating cover plate plays the role of insulating, and improves the safety performance of the motor. The protruding portion is in buckling connection with the insulating cover plate, so that the insulating framework is connected with the insulating cover plate, to improve the reliability of the connection between the insulating cover plate and the insulating framework.

It can be understood that both the insulating cover plate and the insulating framework are made by insulating materials.

In any of the above embodiments, furthermore, the surface of the protruding portion close to the bottom of the second support is located at the side of the bottom wall of the wire slot away from the bottom of the second support.

In the embodiment, the surface of the protruding portion close to the bottom of the second support is located at the side of the bottom wall of the wire slot away from the bottom of the second support; through the above arrangement, the surface of the protruding portion close to the bottom of the second support is higher than the bottom wall of the wire slot, that is, the bottom wall of the wire slot is lower than the lower surface of the protruding portion, and furthermore, the wire tail of the coil is wound from the side of the protruding portion away from the wire slot towards the wire slot, which can prevent the coil from bending at the wire slot and further make the wiring of the coil more compact.

In an embodiment, the distance between the lower surface of the protruding portion and the bottom wall of the wire slot is larger than or equal to the diameter of the conducting wire in the coil. It can be understood that the coil is formed by winding a conducting wire around the block core and the insulating framework.

In any of the above embodiments, furthermore, the length of the terminal accommodating portion protruding out of the second support is greater than the length of the protruding portion protruding out of the second support.

In the embodiment, both the terminal accommodating portion and the protruding portion protrude out of the second support towards the side away from the first support, and the length of the protruding portion protruding out of the second support is less than the length of the terminal accommodating portion protruding out of the second support, and thus, when the insulating framework is connected with the insulating cover plate, this avoids interference to the connection between the insulating framework and the insulating cover plate, and ensures the reliability of their connection.

It can be understood that the second support, the third support and the first support are sequentially distributed along the second direction, and the length of the protruding portion along the second direction is less than the length of the terminal accommodating portion.

It can be understood that the second direction is the radial direction of the stator core.

In any of the above embodiments, furthermore, the insulating framework further comprises a step portion provided on the second support, and the step portion is located at the side of the protruding portion away from the wire slot.

In the embodiment, the insulating framework further comprises the step portion, the step portion is provided on the second support for bearing the coil, and in an embodiment, the step portion is configured to bear the wire tail of the coil. The tightness of the winding of the coil is improved.

In an embodiment, the step portion is provided at the side of the protruding portion away from the wire slot, and thus, the wire tail of the coil is wound from the upper surface of the step portion to below the protruding portion, and further extends into the wire slot, and the wire tail of the coil is fixed through the wire slot.

In any of the above embodiments, furthermore, the third support is provided with a plurality of auxiliary grooves, any of the auxiliary grooves extends along the first direction, the plurality of auxiliary grooves are distributed along the second direction, and the first support, the third support and the second support are sequentially distributed along the second direction.

In the embodiment, the third support is provided with auxiliary grooves, the number of the auxiliary grooves is multiple, the coil is fixed through the auxiliary grooves, to improve the tightness and stability of the winding of the coil. And each auxiliary groove extends along the first direction, the plurality of auxiliary grooves are distributed in array along the second direction, and the coil is wound around the insulating framework by the auxiliary grooves.

In an embodiment, the auxiliary grooves are provided in the upper surface of the third support, and the auxiliary grooves are cut flatly by the side surface of the third support directly when extending naturally along the outer surface of the third support.

In any of the above embodiments, furthermore, the edge of the inclined portion close to the bottom of the second support is approximately flush with the bottom of the auxiliary grooves.

In the embodiment, the edge of the inclined portion close to the bottom of the second support is approximately aligned with the bottom of the auxiliary grooves, and this prevents the bending of the coil and ensures the tightness of the winding of the coil.

It can be understood that the edge of the inclined portion which is close to the bottom of the second support is the lower edge of the inclined portion. The lower edge of the inclined portion is approximately flush with the bottom of the auxiliary grooves, that is, the lower edge of the inclined portion is flush with the bottom of the auxiliary grooves, or the lower edge of the inclined portion is slightly higher than the bottom of the auxiliary grooves.

In any of the above embodiments, furthermore, the wall surface of the wire slot close to the terminal accommodating portion is approximately flush with the wall surface of the third support close to the wire slot.

In the embodiment, the wall surface of the wire slot close to the terminal accommodating portion is approximately flush with the wall surface of the third support close to the wire slot, and thus, when the coil is wound from the wire slot to the third support, the winding of the coil is more compact, to improve the slot fill factor of the stator core.

It can be understood that the wall surface of the wire slot close to the terminal accommodating portion is approximately flush with the wall surface of the third support close to the wire slot, that is, the wall surface of the wire slot close to the accommodating portion is flush with the wall surface of the third support close to the wire slot, or there is a tiny distance between the wall surface of the wire slot close to the accommodating portion and the wall surface of the third support close to the wire slot.

In any of the above embodiments, furthermore, the side of the first support facing the second support is provided with a cut, the cut is arranged close to the bottom of the first support, and along the first direction, the cut is located at the two sides of the third support.

In the embodiment, the first support is disposed with a cut, the cut is located at the inner side of the first support, and this can evade the winding of the coil, and ensures the tightness of the winding of the coil.

In an embodiment, the cut is located at the side of the first support facing the second support, and provided close to the bottom of the first support; and, furthermore, along the first direction, the cut is disposed at the two sides of the third support, and thus this can decrease the integral weight of the insulating framework, reduce the production cost, and can further prevent affecting the winding of the coil due to excessive compressing to the coil by the third support.

For example, the wall surface of the first support facing the second support is approximately a plane, the wall surface of the first support away from the second support is arc-shaped, and furthermore, when the insulating framework is used in the stator, the first support can enclose a ring shape to adapt to the shape of the tooth portion of the stator, and this is convenient for the loading and moving of the rotor. Meanwhile, due to the arrangement of the cut, the shape of the first support can adapt to the end of the tooth portion of the stator facing the interior of the stator, and this increases the slot fill factor of the stator and meanwhile makes the integral connection more compact.

In an embodiment, the cut is a flat and non-through structure.

In any of the above embodiments, furthermore, the side of the cut close to the top of the first support is flush with the top of the auxiliary grooves.

In the embodiment, the side of the cut close to the top of the first support is flush with one side of the top of the auxiliary grooves, and this ensures the effect of evading the coil by the cut, and increases the slot fill factor of the stator.

In any of the above embodiments, furthermore, the insulating framework further comprises a marker provided on at least one of the second support and the first support, and the marker corresponds to the width of the notch of the terminal accommodating portion and the width of the auxiliary groove of the third support.

In the embodiment, the insulating framework further comprises the marker, the marker is provided on at least one of the second support and the first support, and it can be understood that winding different stators will correspond to different coil diameters, and further correspond to different auxiliary groove widths and different notch widths, that is, the diameter of the coil is in one-to-one correspondence with the width of the notch and the width of the auxiliary groove, and therefore, the diameter of the coil varies synchronously with the width of the notch and the width of the auxiliary groove; therefore, according to the embodiment proposed by the present disclosure, the marker is provided on the insulating framework, and the marker is in one-to-one correspondence with the diameter of the coil, the width of the notch and the width of the auxiliary groove, and this can be configured to select different insulating frameworks based on the markers according to different coil diameters; in an embodiment, different insulating frameworks correspond to different dimensions of notch width and auxiliary groove width, and then the insulating frameworks of multiple dimensions and speculations can adapt to coils of different dimensions.

In an embodiment, the width of the notch and the yoke width of the auxiliary groove have multiple dimensions, and can be selected and used according to actual conditions.

In an embodiment, the marker can be a number, a letter or a symbol with the same function.

For example, the marker is provided at the terminal accommodating portion of the second support, and furthermore, the marker is provided on the top of the terminal accommodating portion for the convenience of users' identification.

The second aspect according to the present disclosure further proposes a stator, including: a stator core, and the stator core comprises a plurality of block cores connected in sequence, the block cores comprise tooth portions, and a stator groove is enclosed by the tooth portions of two adjacent block cores; an insulating framework according to in any of the embodiments of the first aspect, and the number of the insulating frameworks is multiple, the two ends of any of the block cores are provided with the insulating frameworks, and the third support is disposed opposite to the tooth portions; and a winding, and the winding is wound around the tooth portions and the insulating frameworks.

The stator proposed by the second aspect of the present disclosure comprises the insulating framework proposed by any of the embodiments in the first aspect, and thus has all the beneficial effect of the insulating framework.

Furthermore, the stator comprises the stator core, the stator core comprises a plurality of block cores connected in sequence, the block cores comprise the tooth portions, and the stator groove is enclosed between the tooth portions of two adjacent block cores for accommodating the winding, and both ends of each of the block cores are provided with the insulating frameworks, so that the winding can be wound around the tooth portions and the insulating frameworks, and the insulating performance is ensured. Meanwhile, by this winding method, the electrical connection of in-phase windings can be achieved on the insulating framework, and it is not necessary to stack other structures for achieving the electrical connections, to further lower the axial height of the stator and making the ends of the stator more compact.

In the above embodiment, furthermore, the winding comprises a plurality of coils, one of the coils is wound around one of the block cores and the insulating frameworks at the two ends of the block core, the coil comprises a wire head and a wire tail, and the wire slot is configured to accommodate the wire head and the wire tail.

In the embodiment, the winding comprises a plurality of coils, one block core and the insulating frameworks at the two ends of the block core constitute a core component, and each core component is wound with one coil, and after each coil is wound, the plurality of core components are rounded to form the stator, and thus, this can prevent scratching the insulating layer on the surface of the coil while the slot fill factor is improved.

The coil comprises a wire head and a wire tail, and the wire slot is configured to accommodate the wire head and the wire tail, to ensure the tightness of the winding of the coil.

In an embodiment, the wire head is buckled in the wire slot in one end of the stator core in the axial direction, then extends towards the other end of the stator core, and starts to wind from the side of the insulating framework away from the wire slot, so that the wire tail is located at the side of the insulating framework close to the wire slot, and then, the wire tail is wound to the step portion, then extends to below the protruding portion via the upper surface of the step portion, further extends into the wire slot, and is pre-fixed in the wire slot. When all the coils are wound, the plurality of block cores are rounded to form the stator; compared with the prior art, the embodiment proposed in the present disclosure can not only improve the slot fill factor of the stator, but further prevent causing damage to the insulating layer of the coil itself.

In the above embodiment, furthermore, the stator further comprises an insulating cover plate, and the insulating cover plate is provided at the side of the insulating framework away from the stator core, and the insulating cover plate is in buckling connection with the protruding portion of the insulating framework.

In the embodiment, the insulating framework further comprises the insulating cover plate, the insulating cover plate is provided at the side of the insulating framework away from the stator core, and through disposing the insulating framework, the insulating protection for the two ends of the coil can be achieved, and the safety performance of the stator is improved. And the insulating cover plate is connected with the protruding portion of the insulating framework, and this achieves fixing the insulating cover plate, so that the integral structure of the stator is more compact and the effective locking of the two is achieved.

Furthermore, the insulating cover plate is in buckling connection with the protruding portion of the insulating framework.

For example, the insulating cover plate is provided with a buckle, the buckle is in buckling connection with the protruding portion. It can be understood that the length of the protruding portion is less than the length of the terminal accommodating portion, and therefore, the buckling connection between the buckle and the protruding portion is ensured.

Furthermore, any of the block cores comprises a plurality of punching sheets, and the plurality of punching sheets are laminated along the axial direction of the stator core.

In the embodiment, it is arranged that each block core comprises a plurality of punching sheets, and the plurality of punching sheets are laminated along the axial direction of the stator core, and thus, an overlapping portion is formed at the circumferential edge of the punching sheets; when the plurality of punching sheets are laminated along the axial direction of the core, an overlapping gap is defined between adjacent punching sheets and formed in the stator groove, and it is convenient to wind the winding around the tooth portion of the stator core and locate the winding inside the stator groove.

In an embodiment, the punching sheet is a silicon steel sheet.

Furthermore, two adjacent block cores are rotatably connected through the overlapping portion.

In the embodiment, two adjacent block cores are rotatably connected through the overlapping portion, i.e., the two block cores after connection can rotate relative to each other.

Through rotatably connecting the two adjacent block cores via the overlapping portion, one block core can be made to rotate around the other block core with the connecting point of the overlapping portion as the center of a circle, and this connecting method is simple and reliable, and helps operators conduct adjustments to the shape and the structure of the stator core, and the position of the block core can be adjusted according to the needs in use.

In the above embodiment, furthermore, the stator core comprises a tooth portion and a yoke portion, and the stator core at least comprises a first state and a second state; in the first state, the plurality of block cores are rounded to form a first ring, and the tooth portions are located at the inner side of the yoke portion; and in the second state, the plurality of block cores unfold to approximately present a straight-line form.

In the embodiment, the stator core comprises the first state, the first state is a conventional state after the winding is wound around the stator core; in the first state, the plurality of block cores are rounded to form the first ring, and the tooth portions are located at the inner side of the yoke portion. Under this state, the winding is wound in the stator groove constituted by adjacent tooth portions, and the winding is close to the inner side of the stator core, and two adjacent stator cores are rotatably connected to each other through the overlapping portion provided on the yoke portion at the outer side, and jointly enclose a circular stator core.

The stator core further comprises the second state; since two adjacent block cores are in rotatable connection, when two adjacent block cores in the stator core move relative to each other, the plurality of block cores can unfold to approximately present a straight-line form. The tooth portions of the unfolded block cores are distributed approximately in a straight-line form, since the stator core is in an unfolded state, the space of the stator groove between two tooth portions increases to a certain extent compared with the first state, and this helps operators wind the winding.

Through putting the stator core in the second state, the tooth portions can be made to approximately present a straight-line distribution, and the space of the stator groove is made to increase, to help the operators wind the winding. After accomplishing the operation of winding the winding, the stator core is enclosed into the first state, so that the block cores enclose a circular stator core, to make the structure of the stator core stable and reliable.

Furthermore, in the second state, two block cores at the two ends are connected to each other after the rounding, and in an embodiment, the two block cores can be welded after the rounding.

It can be understood that the stator core approximately presents a straight-line form in the second state, including the situations that the stator core presents a straight-line form, or the stator core has a certain radian.

In the above embodiment, furthermore, the plurality of punching sheets comprise a first punching sheet layer and a second punching sheet layer which are arranged alternatively; the first side of the first punching sheet layer is provided with an overlapping portion, the overlapping portion on the first punching sheet layer protrudes out of the second punching sheet layer, and an overlapping gap is enclosed by two adjacent first punching sheet layers; the second side of the second punching sheet layer is provided with an overlapping portion, the overlapping portion on the second punching sheet layer protrudes out of the first punching sheet layer, and an overlapping gap is enclosed by two adjacent second punching sheet layers; for two adjacent block cores, the overlapping portion of one block core is inserted into the overlapping gap of the other block core.

In the embodiment, the plurality of punching sheets comprise the first punching sheet layer and the second punching sheet layer, and a plurality of the first punching sheet layers and a plurality of the second punching sheet layers are distributed alternatively along the axial direction of the stator core. The first punching sheet layer is provided with an overlapping portion at the first side, and the overlapping portion on the first punching sheet layer protrudes out of the second punching sheet layer; since the plurality of the first punching sheet layers and the plurality of the second punching sheet layers are arranged alternatively, both of two adjacent first punching sheet layers protrude out of the second punching sheet layer provided in the middle of the two adjacent first punching sheet layers, so that an overlapping gap is enclosed between the two adjacent first punching sheet layers. The second punching sheet layer is provided with an overlapping portion at the second side, that is, the second punching sheet layer is provided with the overlapping portion at the side different from the first punching sheet layer. The overlapping portion on the second punching sheet layer protrudes out of the first punching sheet layer; since the plurality of the first punching sheet layers and the plurality of the second punching sheet layers are arranged alternatively, both of two adjacent second punching sheet layers protrude out of the first punching sheet layer arranged in the middle of the two adjacent second punching sheet layers, so that the overlapping gap can further be enclosed between the two adjacent second punching sheet layers.

It can be understood that the overlapping portions of the plurality of the first punching sheet layers disposed at the first side and the overlapping portions of the plurality of the second punching sheet layers disposed at the second side are in an interlacing arrangement when the plurality of the first punching sheet layers and the plurality of the second punching sheet layers are distributed alternatively along the circumferential direction of the stator core. Furthermore, the overlapping gap located between two adjacent first punching sheet layers and the overlapping gap located between two adjacent second punching sheet layers are respectively located at the two sides of the block core and are in an interlacing arrangement.

An overlapping portion and an overlapping gap are respectively provided at the sides of two adjacent block cores close to each other, since the overlapping portions of the plurality of the first punching sheet layers disposed at the first side and the overlapping portions of the plurality of the second punching sheet layers disposed at the second side are in interlacing arrangement, and the overlapping gap located between two adjacent first punching sheet layers and the overlapping gap located between two adjacent second punching sheet layers are in interlacing arrangement, the overlapping portion of one block core is inserted into the overlapping gap of another block core, to achieve the connection of two adjacent block cores.

Through alternatively arranging the first punching sheet layers and the second punching sheet layers, arranging the overlapping portions respectively at different sides of the first punching sheet layers and the second punching sheet layers, and enclosing the overlapping gaps at different sides through the first punching sheet layers and the second punching sheet layers, two adjacent block cores can be connected through the overlapping portion and the overlapping gap, and in an embodiment, the overlapping portion of one block core is inserted into the overlapping gap of the other block core. This connecting method is stable and reliable, and an operator can disassemble and assemble the stator core rapidly, and then the work efficiency is improved. The mutual connection can be achieved as long as the plurality of block cores adopt the same structure, the categories of the block cores are decreased, the universality of the block cores are improved, and the product cost is reduced.

In the above embodiment, furthermore, the plurality of punching sheets comprise a first punching sheet layer and a second punching sheet layer which are arranged alternatively; the first side of the first punching sheet layer is provided with an overlapping portion, the overlapping portion on the first punching sheet layer protrudes out of the second punching sheet layer, and an overlapping gap is enclosed by two adjacent first punching sheet layers; the second side of the second punching sheet layer is provided with an overlapping portion, the overlapping portion on the second punching sheet layer protrudes out of the first punching sheet layer, and an overlapping gap is enclosed by two adjacent second punching sheet layers; for two adjacent block cores, the overlapping portion of one block core is inserted into the overlapping gap of the other block core.

In the embodiment, the plurality of punching sheets comprise the first punching sheet layer and the second punching sheet layer, and a plurality of the first punching sheet layers and a plurality of the second punching sheet layers are distributed alternatively along the axial direction of the stator core. The first punching sheet layer is provided with an overlapping portion at the first side, and the overlapping portion on the first punching sheet layer protrudes out of the second punching sheet layer; since the plurality of the first punching sheet layers and the plurality of the second punching sheet layers are arranged alternatively, both of two adjacent first punching sheet layers protrude out of the second punching sheet layer provided in the middle of the two adjacent first punching sheet layers, so that an overlapping gap is enclosed between the two adjacent first punching sheet layers. The second punching sheet layer is provided with an overlapping portion at the second side, that is, the second punching sheet layer is provided with the overlapping portion at the side different from the first punching sheet layer. The overlapping portion on the second punching sheet layer protrudes out of the first punching sheet layer; since the plurality of the first punching sheet layers and the plurality of the second punching sheet layers are arranged alternatively, both of two adjacent second punching sheet layers protrude out of the first punching sheet layer arranged in the middle of the two adjacent second punching sheet layers, so that the overlapping gap can further be enclosed between the two adjacent second punching sheet layers.

It can be understood that the overlapping portions of the plurality of the first punching sheet layers disposed at the first side and the overlapping portions of the plurality of the second punching sheet layers disposed at the second side are in an interlacing arrangement when the plurality of the first punching sheet layers and the plurality of the second punching sheet layers are distributed alternatively along the circumferential direction of the stator core. Furthermore, the overlapping gap located between two adjacent first punching sheet layers and the overlapping gap located between two adjacent second punching sheet layers are respectively located at the two sides of the block core and are in an interlacing arrangement.

An overlapping portion and an overlapping gap are respectively provided at the sides of two adjacent block cores close to each other; since the overlapping portions of the plurality of the first punching sheet layers disposed at the first side and the overlapping portions of the plurality of the second punching sheet layers disposed at the second side are in interlacing arrangement, and the overlapping gap located between two adjacent first punching sheet layers and the overlapping gap located between two adjacent second punching sheet layers are in interlacing arrangement, the overlapping portion of one block core is inserted into the overlapping gap of another block core, to achieve the connection of the two adjacent block cores.

Through alternatively arranging the first punching sheet layers and the second punching sheet layers, arranging the overlapping portions respectively at different sides of the first punching sheet layers and the second punching sheet layers, and enclosing the overlapping gaps at different sides through the first punching sheet layers and the second punching sheet layers, two adjacent block cores can be connected through the overlapping portions and the overlapping gaps, and in an embodiment, the overlapping portion of one block core is inserted into the overlapping gap of the other block core. This connecting method is stable and reliable, and an operator can disassemble and assemble the stator core rapidly, and then the work efficiency is improved. The mutual connection can be achieved as long as the plurality of block cores adopt the same structure, the categories of the block cores are decreased, the universality of the block cores are improved, and the product cost is reduced.

The third aspect according to the present disclosure further proposes a motor, including: the stator proposed in the second aspect; and a rotor, cooperating with the stator and rotating.

The motor proposed in the third aspect of the present disclosure comprises the stator proposed in the above first aspect, and thus has all the beneficial effect of the stator.

In addition, the motor further comprises the rotor, the rotor is disposed inside the stator and can cooperate with the stator to rotate, and further outputs a torque.

The fourth aspect according to the present disclosure further proposes a compressor, including the motor proposed in the third aspect.

The compressor proposed by the fourth aspect of the present disclosure comprises the motor proposed in the above third aspect, and thus has all the beneficial effect of the motor.

The fifth aspect according to the present disclosure further proposes a vehicle, including the compressor proposed in the fourth aspect.

The vehicle proposed by the fifth aspect of the present disclosure comprises the compressor proposed in the above fourth aspect, and thus has all the beneficial effect of the compressor.

The sixth aspect according to the present disclosure further proposes an insulating framework, including: a first support; a second support disposed opposite to the first support, and a terminal accommodating portion is provided at the side of the second support away from the first support; the terminal accommodating portion comprises: an accommodating groove for accommodating a crimp terminal, and along a first direction, a notch is provided in the side walls of the accommodating groove disposed opposite to each other; and a glue overflow groove, and along the first direction, the glue overflow groove is located at least at one side of the accommodating groove, and the glue overflow groove is in communication with the notch; and a third support, and the third support is located between the first support and the second support and is connected to the first support and the second support.

The insulating framework proposed by the present disclosure comprises the first support, the second support and the third support, the second support and the first support are distributed opposite to each other, and the third support is provided between the first support and the second support; moreover, one end of the third support is connected with the first support, and the other end of the third support is connected with the second support, so that the first support, the second support and the third support are connected integrally. And the insulating framework further comprises the terminal accommodating portion, the terminal accommodating portion is provided on the second support, the crimp terminal is provided inside the terminal accommodating portion, in-phase coils are connected inside the terminal accommodating portion through the crimp terminal, so that the in-phase coils are in series connection. And the terminal accommodating portion is provided at the side of the second support away from the first support, and thus this avoids occupying the winding space of the coils. Meanwhile, the terminal accommodating portion and the wire slot are distributed along the first direction to facilitate the winding of the coils and the series connection of the in-phase coils. In addition, through disposing a terminal accommodating groove in the insulating framework, the electrical connection of each coil is achieved through the crimp terminal, and this prevents stacking other structures for achieving in-phase electrical connection above the insulating framework, and the integral dimension of the stator is further reduced.

And the first direction is the circumferential direction of the stator core.

Furthermore, the terminal accommodating portion comprises the accommodating groove and the glue overflow groove, the accommodating groove is used for accommodating the crimp terminal of the stator, and the notch is provided in the accommodating groove, the wire head and the wire tail of in-phase coils extend into the accommodating groove through the notch at one side of the accommodating groove, which plays the role of positioning the coils and ensures the stability of the coils, and meanwhile, the electrical connection of the in-phase coils is achieved through the crimp terminal.

In addition, the glue overflow groove is provided at least at one side of the two sides of the accommodating groove and is in communication with the notch, and thus, after the in-phase coils are electrically connected through a connecting terminal, the coils are sealed through a sealant at the accommodating groove and the notch, and this improves the safety performance of the coils, and moreover, due to the arrangement of the glue overflow groove, in the process of using the sealant to seal the crimp terminal, the redundant sealant will be blocked by the glue overflow groove, so that the sealant will not overflow to the outer side of the terminal accommodating portion, to achieve relatively good sealing for the coils.

In a specific disclosure, two notches are provided in the accommodating groove, the two notches are respectively provided in the two side walls of the accommodating groove in the first direction. Likewise, the number of the glue overflow grooves is two, and the two glue overflow grooves are respectively provided corresponding to the two notches, so that the overflow of the sealant at the two notches can be prevented through the glue overflow grooves when sealing is conducted at the two notches.

It can be understood that when the crimp terminal and the cut section of a conducting wire are sealed, if a sealant with a low viscosity is used, the sealant can easily flow away along the side wall of the accommodating groove, and thus it is difficult to achieve complete sealing to the crimp terminal and the cut section of the conducting wire. If a sealant with a high viscosity is used, as the flowability of the sealant is not high and the notches of the accommodating groove are relatively narrow, it is difficult to cover them completely. Therefore, through disposing the glue overflow grooves according to the present disclosure, the overflow of the sealant is prevented, and the complete sealing to the crimp terminal and the cut section of the conducting wire of the coil is achieved. In addition, a good sealing for the wire tail can be achieved when the wire tail of the coil is sealed.

The above heating equipment proposed according to the present disclosure can further comprise the following additional features:

in the above embodiment, furthermore, the terminal accommodating portion further comprises: a glue overflow table, and the glue overflow table is provided at the two sides of the accommodating groove along the first direction; and a lug boss, provided on the glue overflow table, and the glue overflow groove is enclosed at least by the lug boss and the glue overflow table.

In the embodiment, the terminal accommodating portion further comprises the glue overflow table and the lug boss, the glue overflow table is provided at the two sides of the accommodating groove, i.e., a protruding glue overflow table is provided at the two sides of the accommodating groove in the first direction, and the lug boss is provided on the glue overflow table, so that the glue overflow groove is enclosed at least by the glue overflow table and the lug boss, and thus at least a portion of the notches are surrounded by the glue overflow groove, and furthermore the redundant sealant can flow into the glue overflow groove when the sealant is poured into the accommodating groove and the notches for sealing, and then the sealant is prevented from overflowing the terminal accommodating portion.

It can be understood that the crimp terminal pierces the coils so that the in-phase coils are connected.

The crimp terminal can be a piercing terminal, and thus the crimp terminal can pierce the insulating coating on the surface of the coils in the process of compressing the coils within the accommodating groove, to achieve the electrical connection of the in-phase coils and thus achieving rapid connection.

In any of the above embodiments, furthermore, the lug boss comprises: a first bump, and along the first direction, the first bump is provided at the first side of the accommodating groove and is located at the side of the notch away from the first support; and a second bump, and along the first direction, the second bump is provided at the second side of the accommodating groove, and the glue overflow groove is enclosed by the second bump, the second support, the accommodating groove and the glue overflow table, and a gap is provided between the second bump and the accommodating groove.

In the embodiment, the lug boss comprises the first bump and the second bump, and the first bump and the second bump are respectively provided on the glue overflow tables on the two sides of the accommodating groove, and the first bump is located at the side of the accommodating groove away from the terminal accommodating portion, and located at the side of the notch away from the first support, and thus, the redundant sealant can be blocked by the first bump when the sealant is poured into the accommodating groove and the notches, to avoid the overflow of the sealant. The second bump is provided at the side of the accommodating groove close to the terminal accommodating portion, and the glue overflow groove is enclosed by the second bump, the surface of the second support and the outer side wall surface of the accommodating groove, and the end portion of the second bump and the wall surface of the accommodating groove are not completely closed therebetween and have a gap, and this helps the cutting and sealing of the wire tail of the coil.

For example, a wire slot is provided in the bottom of the first bump, the wire slot is disposed opposite to the notches, so that the coil can be further fixed in the wire slot, to improve the fixing performance of the coil.

In addition, the dimension of the gap is relatively small, which prevents the sealant from flowing out. In an embodiment, the width of the gap is greater than or equal to 1 mm, and is less than or equal to 5 mm.

In any of the above embodiments, furthermore, the notch comprises a first channel and a second channel which are in communication, the first channel is located on the top of the second channel, and the side wall of the first channel is provided gradually expanding towards the two sides of the first channel.

In the embodiment, the notch comprises the first channel and the second channel which are in communication, i.e., the notch is divided into an upper half portion and a lower half portion, and the first channel is located at the upper half portion, the second channel is located at the lower half portion, and the upper half portion is in communication with the lower half portion, and the side wall of the first channel is arranged expanding gradually to help pass the wire at the notch; meanwhile, the inclining arrangement of the upper half portion of the notch can further help the pouring of the sealant, so that the sealant can flow towards the bottom of the notch along the wall surface arranged inclinedly, to improve the sealing effect of the sealant to the cut section of the coil.

For example, the notch approximately presents a U shape, the side wall of the first channel presents a sloping shape, the side wall of the second channel is approximately straight.

In any of the above embodiments, furthermore, the insulating framework further comprises a protruding portion, provided at the side of the second support away from the first support, and along the first direction, the protruding portion and the terminal accommodating portion are arranged sequentially.

In the embodiment, the insulating framework further comprises the protruding portion, the protruding portion is provided on the second support and located at the side of the second support away from the first support and the third support; the protruding portion and the terminal accommodating portion are arranged sequentially along the first direction, and the arrangement of the protruding portion can play the role of limiting the coil, and preventing the coil from escaping; and in an embodiment, the arrangement of the protruding portion can prevent the escaping of the wire tail of the coil and improve the fixing performance of the coil.

The stator can comprise the stator core, the insulating framework and an insulating cover plate; the insulating framework is provided at the two ends of the stator core, and the insulating cover plate is provided at the two ends of the insulating framework away from the stator core. The insulating cover plate plays the role of insulating, and improves the safety performance of the motor. And the protruding portion is in buckling connection with the insulating cover plate, so that the insulating framework is connected with the insulating cover plate, to improve the reliability of the connection between the insulating cover plate and the insulating framework.

It can be understood that both the insulating cover plate and the insulating framework are made by insulating materials.

In an embodiment, the second support is provided with a wire slot, and the protruding portion, the wire slot and the terminal accommodating portion are arranged sequentially along the first direction. The wire slot comprises a bottom wall, the bottom wall of the wire slot inclines towards the bottom of the second support to form an inclined portion arranged inclinedly, and the inclined portion is located at a side close to the first support, and thus, when a wire is wound by the insulating framework, the coil extends into the wire slot from the side of the wire slot away from the first support and thus extends along the inclined portion to the bottom of the first support, so that winding of the coil is facilitated; meanwhile, the wire slot can pre-fix the coil, so that the winding of the coil is more compact, the fixing performance of the coil is improved, and the slot fill factor of the stator core is improved.

The insulating framework can be used in the stator, the stator comprises a stator core, a coil and the above insulating framework; and, the insulating framework is provided at the two ends of the stator core in the axial direction, and the coil is wound around the insulating framework and the stator core. A winding accommodating portion is enclosed by the first support, the second support and the third support for accommodating the coil, the stator core inlets wire through the wire slot, so that the coil inclines downwards along the inclined portion and the winding of the coil is more compact.

It can be understood that the wire slot comprises an opening and a bottom wall disposed opposite to the opening, a portion of the bottom wall of the wire slot inclines towards the bottom direction of the second support to form the inclined portion; moreover, the inclined portion is provided at the side of the wire slot facing the first support, i.e., the inclined portion is provided at the inner side of the first support. That is, the upper half portion of the wire slot approximately presents a U shape, the opening is located in the U-shaped top, the lower half portion of the wire slot presents a sloping shape, so that the coil is more compact when the wire crosses, and the fixing performance of the winding of the coil is improved.

In an embodiment, when the insulating framework is used in the stator, the first support is close to the inner side of the stator core, the second support is close to the outer side of the stator core, and the third support is connected with and located between the first support and the second support.

For block cores, each block core is wound with a coil, each coil comprises a wire head and a wire tail, and after accomplishing the winding, the wire tail extends into the wire slot through the bottom of the protruding portion, and the coil is limited through the wire slot.

It can be understood that along the first direction, the wire slot comprises a first side and a second side; the first side of the wire slot and the second side of the wire slot are two sides of the wire slot disposed opposite to each other, and the side of the wire slot close to the terminal accommodating portion is the first side of the wire slot, and the side of the wire slot close to the protruding portion is the second side of the wire slot.

Furthermore, the width of the wire slot is greater than that of the notch.

In the embodiment, both the wire head and the wire tail of the coil are provided in the notch, which helps the coil enter into the groove, the width of the wire slot is greater than that of the notch, so that the wire head and the wire tail are in more compact connection with the notch when entering into the notch, to improve the fixing performance of the notch to the coil.

For example, the width of the wire slot is further the width of the wire slot along the first direction, and the width of the notch is further the width of the notch along a second direction. In an embodiment, both the wire slot and the notch approximately present a U shape, and the width of the wire slot and the width of the notch are further the distance between the U-shaped side walls at the left and right sides.

Through the above arrangement of the widths of the notch and the wire slot, on the one hand, the notch can accommodate both the wire head and the wire tail of the coil at the same time, and on the other hand can improve the tightness of the coil.

In any of the above embodiments, furthermore, at least a portion of the top wall of the protruding portion inclines towards the bottom of the second support.

In the embodiment, at least a portion of the top wall of the protruding portion inclines towards the bottom of the second support, on the one hand, it decreases the materials used by the protruding portion and reduces the production cost, and on the other hand, it prevents the interference to other structures when the insulating framework is used in cooperation with other structures.

For example, the cross section of the protruding portion approximately presents a triangular shape.

In any of the above embodiments, furthermore, the length of the terminal accommodating portion protruding out of the second support is greater than the length of the protruding portion protruding out of the second support.

In the embodiment, both the terminal accommodating portion and the protruding portion protrude out of the second support towards the side away from the first support, and, the length of the protruding portion protruding out of the second support is less than the length of the terminal accommodating portion protruding out of the second support, and thus, when the insulating framework is connected with the insulating cover plate, this avoids interference to the connection between the insulating framework and the insulating cover plate, and ensures the reliability of their connection.

It can be understood that the second support, the third support and the first support are sequentially distributed along the second direction, and the length of the protruding portion along the second direction is less than the length of the terminal accommodating portion.

It can be understood that the second direction is the radial direction of the stator core.

In any of the above embodiments, furthermore, the surface of the protruding portion close to the bottom of the second support is located at the side of the bottom wall of the wire slot away from the bottom of the second support.

In the embodiment, the surface of the protruding portion close to the bottom of the second support is located at the side of the bottom wall of the wire slot away from the bottom of the second support; through the above arrangement, the surface of the protruding portion close to the bottom of the second support is higher than the bottom wall of the wire slot, that is, the bottom wall of the wire slot is lower than the lower surface of the protruding portion, and furthermore, the wire tail of the coil is wound from the side of the protruding portion away from the wire slot towards the wire slot, which can prevent the coil from bending at the wire slot and further make the wiring of the coil more compact.

In an embodiment, the distance between the lower surface of the protruding portion and the bottom wall of the wire slot is larger than or equal to the diameter of the conducting wire in the coil. It can be understood that the coil is formed by winding a conducting wire around the block core and the insulating framework.

In any of the above embodiments, furthermore, the insulating framework further comprises a step portion provided on the second support, and the step portion is located at the side of the protruding portion away from the terminal accommodating portion.

In the embodiment, the insulating framework further comprises the step portion, the step portion is provided on the second support for bearing the coil, and in an embodiment, the step portion is configured to bear the wire tail of the coil. The tightness of the winding of the coil is improved.

In an embodiment, the step portion is provided at the side of the protruding portion away from the wire slot, and thus, the wire tail of the coil is wound from the upper surface of the step portion to below the protruding portion, and further extends into the wire slot, and the wire tail of the coil is fixed through the wire slot.

In any of the above embodiments, furthermore, the third support is provided with a plurality of auxiliary grooves, any of the auxiliary grooves extends along the first direction, the plurality of auxiliary grooves are distributed along the direction from the first support to the second support, and the first support, the third support and the second support are sequentially distributed along the second direction.

In the embodiment, the third support is provided with auxiliary grooves, the number of the auxiliary grooves is multiple, the coil is fixed through the auxiliary grooves, to improve the tightness and stability of the winding of the coil. And, each auxiliary groove extends along the first direction, the plurality of auxiliary grooves are distributed in array along the second direction, and the coil is wound around the insulating framework by the auxiliary grooves.

In an embodiment, the auxiliary grooves are provided in the upper surface of the third support, and the auxiliary grooves are cut flatly by the side surface of the third support directly when extending naturally along the outer surface of the third support.

In an embodiment, the second direction is the radial direction of the stator.

In any of the above embodiments, furthermore, the edge of the inclined portion close to the bottom of the second support is approximately flush with the bottom of the auxiliary grooves.

In the embodiment, the edge of the inclined portion close to the bottom of the second support is approximately aligned with the bottom of the auxiliary grooves, and this prevents the bending of the coil and ensures the tightness of the winding of the coil.

It can be understood that the edge of the inclined portion which is close to the bottom of the second support is the lower edge of the inclined portion. The lower edge of the inclined portion is approximately flush with the bottom of the auxiliary grooves, that is, the lower edge of the inclined portion is flush with the bottom of the auxiliary grooves, or the lower edge of the inclined portion is slightly higher than the bottom of the auxiliary grooves.

In any of the above embodiments, furthermore, the wall surface of the wire slot close to the terminal accommodating portion is approximately flush with the wall surface of the third support close to the wire slot.

In the embodiment, the wall surface of the wire slot close to the terminal accommodating portion is approximately flush with the wall surface of the third support close to the wire slot, and thus, when the coil is wound from the wire slot to the third support, the winding of the coil is more compact, to improve the slot fill factor of the stator core.

It can be understood that the wall surface of the wire slot close to the terminal accommodating portion is approximately flush with the wall surface of the third support close to the wire slot, that is, the wall surface of the wire slot close to the accommodating portion is flush with the wall surface of the third support close to the wire slot, or there is a tiny distance between the wall surface of the wire slot close to the accommodating portion and the wall surface of the third support close to the wire slot.

In any of the above embodiments, furthermore, the side of the first support facing the second support is provided with a cut, the cut is arranged close to the bottom of the first support, and along the first direction, the cut is located at the two sides of the third support.

In the embodiment, the first support is disposed with a cut, the cut is located at the inner side of the first support, and this can evade the winding of the coil, and ensures the tightness of the winding of the coil.

In an embodiment, the cut is located at the side of the first support facing the second support, and provided close to the bottom of the first support; and, furthermore, along the first direction, the cut is disposed at the two sides of the third support, and thus this can decrease the integral weight of the insulating framework, reduce the production cost, and can further prevent affecting the winding of the coil due to excessive compressing to the coil by the third support.

For example, the wall surface of the first support facing the second support is approximately a plane, the wall surface of the first support away from the second support is arc-shaped, and furthermore, when the insulating framework is used in the stator, the first support can enclose a ring shape to adapt to the shape of the tooth portion of the stator, and this is convenient for the loading and moving of the rotor. Meanwhile, due to the arrangement of the cut, the shape of the first support can adapt to the end of the tooth portion of the stator facing the interior of the stator, and this increases the slot fill factor of the stator and meanwhile makes the integral connection more compact.

In an embodiment, the cut is a flat and non-through structure.

In any of the above embodiments, furthermore, the side of the cut close to the top of the first support is flush with the top of the auxiliary grooves.

In the embodiment, the side of the cut close to the top of the first support is flush with one side of the top of the auxiliary grooves, and this ensures the effect of evading the coil by the cut, and increases the slot fill factor of the stator.

In any of the above embodiments, furthermore, the insulating framework further comprises a marker provided on at least one of the second support and the first support, and the marker corresponds to the width of the notch and the width of the auxiliary groove of the third support.

In the embodiment, the insulating framework further comprises the marker, the marker is provided on at least one of the second support and the first support, and it can be understood that winding different stators will correspond to different coil diameters, and further correspond to different auxiliary groove widths and different notch widths, that is, the diameter of the coil is in one-to-one correspondence with the width of the notch and the width of the auxiliary groove, and therefore, the diameter of the coil varies synchronously with the width of the notch and the width of the auxiliary groove; therefore, according to the embodiment proposed by the present disclosure, the marker is provided on the insulating framework, and the marker is in one-to-one correspondence with the diameter of the coil, the width of the notch and the width of the auxiliary groove, and this can be configured to select different insulating frameworks based on the markers according to different coil diameters; in an embodiment, different insulating frameworks correspond to different dimensions of notch width and auxiliary groove width, and then the insulating frameworks of multiple dimensions and speculations can adapt to coils of different dimensions.

In an embodiment, the width of the notch and the yoke width of the auxiliary groove have multiple dimensions, and can be selected and used according to actual conditions.

In an embodiment, the marker can be a number, a letter or a symbol with the same function.

The marker can be provided at the terminal accommodating portion of the second support, and furthermore, the marker can be provided on the top of the terminal accommodating portion for the convenience of users' identification.

The seventh aspect according to the present disclosure further proposes a stator, including: a crimp terminal, and the crimp terminal is provided in the accommodating groove; a stator core, and the stator core comprises a plurality of block cores connected in sequence, the block cores comprise tooth portions, and a stator groove is enclosed by the tooth portions of two adjacent block cores; the insulating framework according to in any of the embodiments of the six aspect, and the number of the insulating frameworks is multiple, the two ends of any of the block cores are provided with the insulating frameworks, and the third support is disposed opposite to the tooth portions; and a winding, and the winding is wound around the tooth portions and the insulating frameworks.

The stator proposed by the seventh aspect of the present disclosure comprises the insulating framework proposed by any of the above embodiments, and thus has all the beneficial effect of the insulating framework.

Furthermore, the stator comprises the stator core, the stator core comprises a plurality of block cores connected in sequence, the block cores comprise the tooth portions, and the stator groove is enclosed between the tooth portions of two adjacent block cores for accommodating the winding, and both ends of each of the block cores are provided with the insulating frameworks, so that the winding can be wound around the tooth portions and the insulating frameworks, and the insulating performance is ensured. Meanwhile, by this winding method, the electrical connection of in-phase windings can be achieved on the insulating framework, and it is not necessary to stack other structures for achieving the electrical connections, to further lower the axial height of the stator and making the ends of the stator more compact. And the crimp terminal achieves the connection of the in-phase coils in the accommodating groove.

Furthermore, the winding comprises a plurality of coils, one of the coils is wound around one of the block cores and the insulating frameworks at the two ends of the block core, the coil comprises a wire head and a wire tail, and the wire slot is configured to accommodate the wire head and the wire tail.

In the embodiment, the winding comprises a plurality of coils, one block core and the insulating frameworks at the two ends of the block core constitute a core component, and each core component is wound with one coil, and after each coil is wound, the plurality of core components are rounded to form the stator, and thus, this can prevent scratching the insulating layer on the surface of the coil while the slot fill factor is improved.

And the coil comprises a wire head and a wire tail, and the wire slot is configured to accommodate the wire head and the wire tail, to ensure the tightness of the winding of the coil.

In an embodiment, the wire head is buckled in the wire slot in one end of the stator core in the axial direction, then extends towards the other end of the stator core, and starts to wind from the side of the insulating framework away from the wire slot, so that the wire tail is located at the side of the insulating framework close to the wire slot, and then, the wire tail is wound to the step portion, then extends to below the protruding portion via the upper surface of the step portion, further extends into the wire slot, and is pre-fixed in the wire slot. When all the coils are wound, the plurality of block cores are rounded to form the stator; compared with the prior art, the embodiment proposed in the present disclosure can not only improve the slot fill factor of the stator, but further prevent causing damage to the insulating layer of the coil itself.

In any of the above embodiments, furthermore, the stator further comprises an insulating cover plate provided at the two sides of the insulating framework, and an avoiding groove is provided in the insulating cover plate, and the avoiding groove is arranged corresponding to the marker on the insulating framework and is used for avoiding the marker.

In the embodiment, the stator further comprises the insulating cover plate, the avoiding groove is provided in the insulating cover plate for avoiding the marker on the insulating framework.

Furthermore, the stator further comprises the insulating cover plate, and the insulating cover plate is provided at the side of the insulating framework away from the stator core, and the insulating cover plate is in buckling connection with the protruding portion of the insulating framework.

In the embodiment, the insulating framework further comprises the insulating cover plate, the insulating cover plate is provided at the side of the insulating framework away from the stator core, and through disposing the insulating framework, the insulating protection for the two ends of the coil can be achieved, and the safety performance of the stator is improved. And, the insulating cover plate is connected with the protruding portion of the insulating framework, and this achieves fixing the insulating cover plate, so that the integral structure of the stator is more compact and the effective locking of the two is achieved.

Furthermore, the insulating cover plate is in buckling connection with the protruding portion of the insulating framework.

In a specific disclosure, the insulating cover plate is provided with a buckle, the buckle is in buckling connection with the protruding portion. It can be understood that the length of the protruding portion is less than the length of the terminal accommodating portion, and therefore, the buckling connection between the buckle and the protruding portion is ensured.

Furthermore, any of the block cores comprises a plurality of punching sheets, and the plurality of punching sheets are laminated along the axial direction of the stator core.

In the embodiment, it is arranged that each block core comprises a plurality of punching sheets, and the plurality of punching sheets are laminated along the axial direction of the stator core, and thus, an overlapping portion is formed at the circumferential edge of the punching sheets; when the plurality of punching sheets are laminated along the axial direction of the core, an overlapping gap is defined between adjacent punching sheets and formed in the stator groove, and it is convenient to wind the winding around the tooth portion of the stator core and locate the winding inside the stator groove.

In an embodiment, the punching sheet is a silicon steel sheet.

Furthermore, two adjacent block cores are rotatably connected through the overlapping portion.

In the embodiment, two adjacent block cores are rotatably connected through the overlapping portion, i.e., the two block cores after connection can rotate relative to each other.

Through rotatably connect the two adjacent block cores through the overlapping portion, one block core can be made to rotate around the other block core with the connecting point of the overlapping portion as the center of a circle, and this connecting method is simple and reliable, and helps operators conduct adjustments to the shape and the structure of the stator core, and the position of the block core can be adjusted according to the needs in use.

In the above embodiment, furthermore, the stator core comprises a tooth portion and a yoke portion, and the stator core at least comprises a first state and a second state; in the first state, the plurality of block cores are rounded to form a first ring, and the tooth portions are located at the inner side of the yoke portion; and in the second state, the plurality of block cores unfold to approximately present a straight-line form.

In the embodiment, the stator core comprises the first state, the first state is a conventional state after the winding is wound around the stator core; in the first state, the plurality of block cores are rounded to form the first ring, and the tooth portions are located at the inner side of the yoke portion. Under this state, the winding is wound in the stator groove constituted by adjacent tooth portions, and the winding is close to the inner side of the stator core, and two adjacent stator cores are rotatably connected to each other through the overlapping portion provided on the yoke portion at the outer side, and jointly enclose a circular stator core.

The stator core further comprises the second state; since two adjacent block cores are in rotatable connection, when two adjacent block cores in the stator core move relative to each other, the plurality of block cores can unfold to approximately present a straight-line form. The tooth portions of the unfolded block cores are distributed approximately in a straight-line form, since the stator core is in an unfolded state, the space of the stator groove between the two tooth portions increases to a certain extent compared with the first state, and this helps operators wind the winding.

Through putting the stator core in the second state, the tooth portions can be made to approximately present a straight-line distribution, and the space of the stator groove is made to increase, to help the operators wind the winding. After accomplishing the operation of winding the winding, the stator core is enclosed into the first state, so that the block cores enclose a circular stator core, to make the structure of the stator core stable and reliable.

Furthermore, in the second state, two block cores at the two ends are connected to each other after the rounding, and in an embodiment, the two block cores can be welded after the rounding.

It can be understood that the stator core approximately presents a straight-line form in the second state, including the situations that the stator core presents a straight-line form, or the stator core has a certain radian.

In the above embodiment, furthermore, the plurality of punching sheets comprise a first punching sheet layer and a second punching sheet layer which are arranged alternatively; the first side of the first punching sheet layer is provided with an overlapping portion, the overlapping portion on the first punching sheet layer protrudes out of the second punching sheet layer, and an overlapping gap is enclosed by two adjacent first punching sheet layers; the second side of the second punching sheet layer is provided with an overlapping portion, the overlapping portion on the second punching sheet layer protrudes out of the first punching sheet layer, and an overlapping gap is enclosed by two adjacent second punching sheet layers; for two adjacent block cores, the overlapping portion of one block core is inserted into the overlapping gap of the other block core.

In the embodiment, the plurality of punching sheets comprise the first punching sheet layer and the second punching sheet layer, and a plurality of the first punching sheet layers and a plurality of the second punching sheet layers are distributed alternatively along the axial direction of the stator core. The first punching sheet layer is provided with an overlapping portion at the first side, and the overlapping portion on the first punching sheet layer protrudes out of the second punching sheet layer; since the plurality of the first punching sheet layers and the plurality of the second punching sheet layers are arranged alternatively, both of two adjacent first punching sheet layers protrude out of the second punching sheet layer provided in the middle of the two adjacent first punching sheet layers, so that an overlapping gap is enclosed between the two adjacent first punching sheet layers. The second punching sheet layer is provided with an overlapping portion at the second side, that is, the second punching sheet layer is provided with the overlapping portion at the side different from the first punching sheet layer. The overlapping portion on the second punching sheet layer protrudes out of the first punching sheet layer; since the plurality of the first punching sheet layers and the plurality of the second punching sheet layers are arranged alternatively, both of two adjacent second punching sheet layers protrude out of the first punching sheet layer arranged in the middle of the two adjacent second punching sheet layers, so that the overlapping gap can further be enclosed between the two adjacent second punching sheet layers.

It can be understood that the overlapping portions of the plurality of the first punching sheet layers disposed at the first side and the overlapping portions of the plurality of the second punching sheet layers disposed at the second side are in an interlacing arrangement when the plurality of the first punching sheet layers and the plurality of the second punching sheet layers are distributed alternatively along the circumferential direction of the stator core. Furthermore, the overlapping gap located between two adjacent first punching sheet layers and the overlapping gap located between two adjacent second punching sheet layers are respectively located at the two sides of the block core and are in an interlacing arrangement.

An overlapping portion and an overlapping gap are respectively provided at the sides of two adjacent block cores close to each other, since the overlapping portions of the plurality of the first punching sheet layers disposed at the first side and the overlapping portions of the plurality of the second punching sheet layers disposed at the second side are in interlacing arrangement, and the overlapping gap located between two adjacent first punching sheet layers and the overlapping gap located between two adjacent second punching sheet layers are in interlacing arrangement, the overlapping portion of one block core is inserted into the overlapping gap of another block core, to achieve the connection of two adjacent block cores.

Through alternatively arranging the first punching sheet layers and the second punching sheet layers, arranging the overlapping portions respectively at different sides of the first punching sheet layers and the second punching sheet layers, and enclosing the overlapping gaps at different sides through the first punching sheet layers and the second punching sheet layers, two adjacent block cores can be connected through the overlapping portion and the overlapping gap, and in an embodiment, the overlapping portion of one block core is inserted into the overlapping gap of the other block core. This connecting method is stable and reliable, and an operator can disassemble and assemble the stator core rapidly, and then the work efficiency is improved. The mutual connection can be achieved as long as the plurality of block cores adopt the same structure, the categories of the block cores are decreased, the universality of the block cores are improved, and the product cost is reduced.

In the above embodiment, furthermore, the plurality of punching sheets comprise a first punching sheet layer and a second punching sheet layer which are arranged alternatively; the first side of the first punching sheet layer is provided with an overlapping portion, the overlapping portion on the first punching sheet layer protrudes out of the second punching sheet layer, and an overlapping gap is enclosed by two adjacent first punching sheet layers; the second side of the second punching sheet layer is provided with an overlapping portion, the overlapping portion on the second punching sheet layer protrudes out of the first punching sheet layer, and an overlapping gap is enclosed by two adjacent second punching sheet layers; for two adjacent block cores, the overlapping portion of one block core is inserted into the overlapping gap of the other block core.

In the embodiment, the plurality of punching sheets comprise the first punching sheet layer and the second punching sheet layer, and a plurality of the first punching sheet layers and a plurality of the second punching sheet layers are distributed alternatively along the axial direction of the stator core. The first punching sheet layer is provided with an overlapping portion at the first side, and the overlapping portion on the first punching sheet layer protrudes out of the second punching sheet layer; since the plurality of the first punching sheet layers and the plurality of the second punching sheet layers are arranged alternatively, both of two adjacent first punching sheet layers protrude out of the second punching sheet layer provided in the middle of the two adjacent first punching sheet layers, so that an overlapping gap is enclosed between the two adjacent first punching sheet layers. The second punching sheet layer is provided with an overlapping portion at the second side, that is, the second punching sheet layer is provided with the overlapping portion at the side different from the first punching sheet layer. The overlapping portion on the second punching sheet layer protrudes out of the first punching sheet layer; since the plurality of the first punching sheet layers and the plurality of the second punching sheet layers are arranged alternatively, both of two adjacent second punching sheet layers protrude out of the first punching sheet layer arranged in the middle of the two adjacent second punching sheet layers, so that the overlapping gap can further be enclosed between the two adjacent second punching sheet layers.

It can be understood that the overlapping portions of the plurality of the first punching sheet layers disposed at the first side and the overlapping portions of the plurality of the second punching sheet layers disposed at the second side are in an interlacing arrangement when the plurality of the first punching sheet layers and the plurality of the second punching sheet layers are distributed alternatively along the circumferential direction of the stator core. Furthermore, the overlapping gap located between two adjacent first punching sheet layers and the overlapping gap located between two adjacent second punching sheet layers are respectively located at the two sides of the block core and are in an interlacing arrangement.

An overlapping portion and an overlapping gap are respectively provided at the sides of two adjacent block cores close to each other, since the overlapping portions of the plurality of the first punching sheet layers disposed at the first side and the overlapping portions of the plurality of the second punching sheet layers disposed at the second side are in interlacing arrangement, and the overlapping gap located between two adjacent first punching sheet layers and the overlapping gap located between two adjacent second punching sheet layers are in interlacing arrangement, the overlapping portion of one block core is inserted into the overlapping gap of another block core, to achieve the connection of two adjacent block cores.

Through alternatively arranging the first punching sheet layers and the second punching sheet layers, arranging the overlapping portions respectively at different sides of the first punching sheet layers and the second punching sheet layers, and enclosing the overlapping gaps at different sides through the first punching sheet layers and the second punching sheet layers, two adjacent block cores can be connected through the overlapping portion and the overlapping gap, and in an embodiment, the overlapping portion of one block core is inserted into the overlapping gap of the other block core. This connecting method is stable and reliable, and an operator can disassemble and assemble the stator core rapidly, and then the work efficiency is improved. The mutual connection can be achieved as long as the plurality of block cores adopt the same structure, the categories of the block cores are decreased, the universality of the block cores are improved, and the product cost is reduced.

In any of the above embodiments, furthermore, a connecting protrusion bump is provided on the bottom of the second support, a groove is provided in the stator core, and the connecting protrusion is connected with the groove.

In the embodiment, the second support comprises the connecting protrusion for cooperating with the stator core and fixing the insulating framework on the stator core.

The eighth aspect according to the present disclosure further proposes a motor, including: the stator proposed in the seventh aspect; and a rotor, cooperating with the stator and rotating.

The motor proposed in the eighth aspect of the present disclosure comprises the stator proposed in the above seventh aspect, and thus has all the beneficial effect of the stator.

In addition, the motor further comprises the rotor, the rotor is disposed inside the stator and can cooperate with the stator to rotate, to further output a torque.

The ninth aspect according to the present disclosure further proposes a compressor, including the motor proposed in the eighth aspect.

The compressor proposed by the ninth aspect of the present disclosure comprises the motor proposed in the above eighth aspect, and thus has all the beneficial effect of the motor.

The tenth aspect according to the present disclosure further proposes a vehicle, including the compressor proposed in the ninth aspect.

The vehicle proposed by the tenth aspect of the present disclosure comprises the compressor proposed in the above ninth aspect, and thus has all the beneficial effect of the compressor.

The additional aspects and advantages of the present disclosure will be obvious in the following description, or can be understood through the implementation of the present disclosure.

BRIEF DESCRIPTION OF THE DRAWINGS

The above and/or additional aspects and advantages of the present disclosure will be obvious and understood easily from the following description of the embodiments in combination with the accompanying drawings.

The corresponding relationships between the reference signs and the component names in FIG. 1 to FIG. 12 are as follows:

1: first support, 10: cut, 2: second support, 20: wire slot, 22: inclined portion, 24: terminal accommodating portion, 240: accommodating groove, 2400: notch, 2402: first channel, 2404: second channel, 242: glue overflow groove, 244: glue overflow table, 246: lug boss, 2460: first bump, 2462: second bump, 26: protruding portion, 27: connecting protrusion, 28: step portion, 29: marker, 3: third support, 30: auxiliary groove, 4: stator core, 5: winding, 6: insulating cover plate, and 60: buckle.

DETAILED DESCRIPTION OF THE DISCLOSURE

In order to understand the above-mentioned objectives, features and advantages of the present disclosure more clearly, a further detailed description of the present disclosure will be given below in combination with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can further be implemented in other manners than those described herein. Therefore, the protection scope of the embodiments of the present disclosure is not limited to the specific embodiments disclosed below.

An insulating framework, a stator, a motor, a compressor and a vehicle proposed by some embodiments of the present disclosure are described below with reference to FIG. 1 to FIG. 12.

Figure 1:
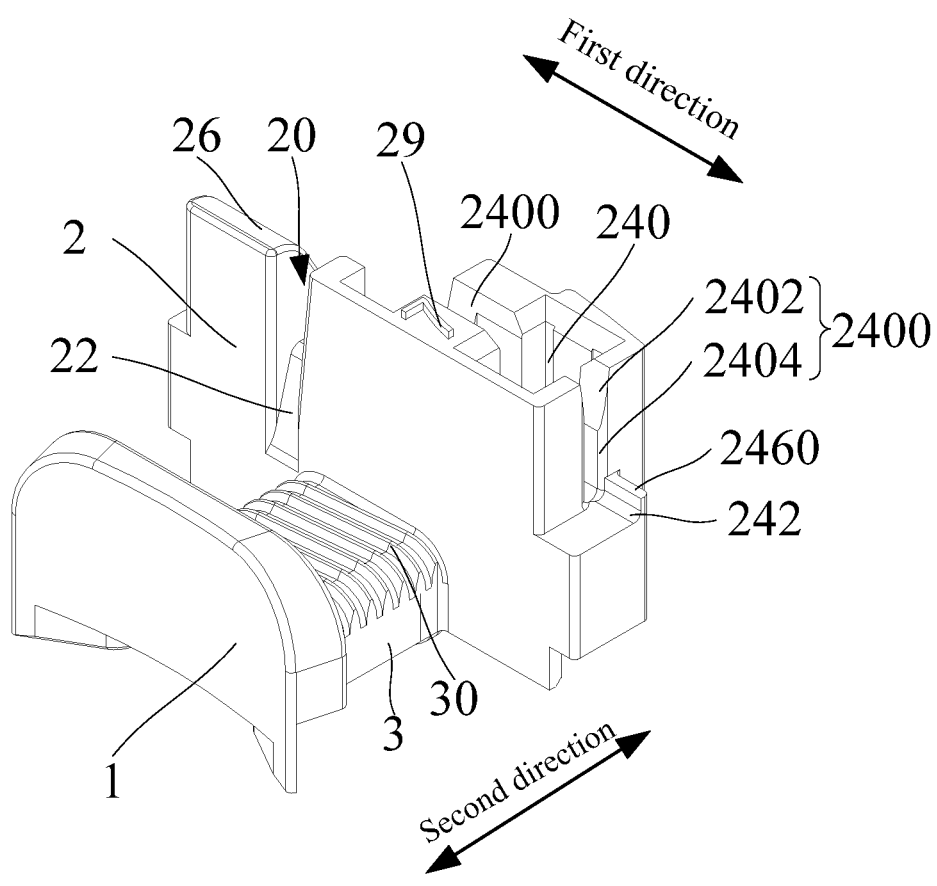
FIG. 1 shows a schematic view of the structure of an insulating framework according to an embodiment of the present disclosure.
Figure 2:
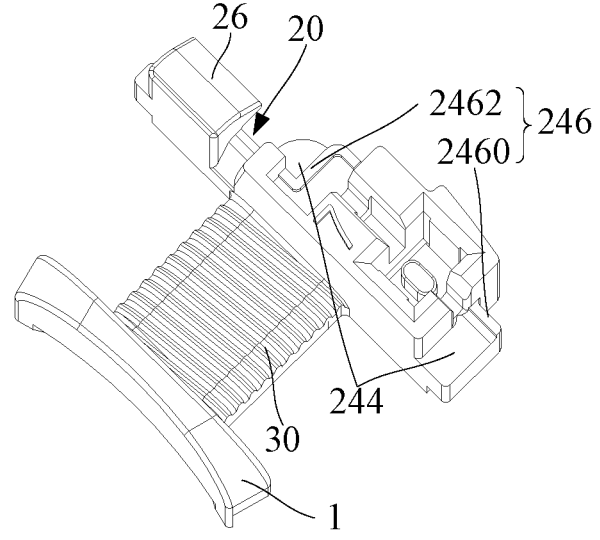
FIG. 2 shows a schematic view of the structure of the insulating framework according to an embodiment of the present disclosure.

As shown in FIG. 1 and FIG. 2, according to an embodiment of the first aspect of the present disclosure, the present disclosure proposes an insulating framework. The insulating framework comprises a first support 1, a second support 2 and a third support 3.

The second support 2 and the first support 1 are distributed opposite to each other; the second support 2 is provided with a wire slot 20, the wire slot 20 passes through the wall surface of the second support 2, a portion of the bottom wall of the wire slot 20 inclines towards the bottom of the second support 2 to form an inclined portion 22, and the inclined portion 22 is located on the side of the wire slot 20 facing the first support 1; and the third support 3 is located between the first support 1 and the second support 2 and connected to the first support 1 and the second support 2.

The insulating framework proposed by the present disclosure comprises the first support 1, the second support 2 and the third support 3, the second support 2 and the first support 1 are distributed opposite to each other, and the third support 3 is provided between the first support 1 and the second support 2; moreover, one end of the third support 3 is connected with the first support 1, and the other end of the third support 3 is connected with the second support 2, so that the first support 1, the second support 2 and the third support 3 are connected integrally. In addition, the second support 2 is provided with the wire slot 20, the wire slot 20 comprises a bottom wall, the bottom wall of the wire slot 20 inclines towards the bottom of the second support 2 to form the inclined portion 22 arranged inclinedly, and the inclined portion 22 is located at a side close to the first support 1. Thus, when a wire is wound by the insulating framework, the coil extends into the wire slot 20 from the side of the wire slot 20 away from the first support 1 and thus extends along the inclined portion 22 to the bottom of the first support 1, so that winding of the coil is facilitated; meanwhile, the wire slot 20 can pre-fix the coil, so that the winding of the coil is more compact, the fixing performance of the coil is improved, and the slot fill factor of the stator core 4 is improved.

The insulating framework can be used in the stator, the stator comprises the stator core 4, the coil and the above insulating framework; and the insulating framework is provided at the two ends of the stator core 4 in the axial direction, and the coil is wound around the insulating framework and the stator core 4. A winding accommodating portion is enclosed by the first support 1, the second support 2 and the third support 3 for accommodating the coil, the stator core 4 inlets wire through the wire slot 20, so that the coil inclines downwards along the inclined portion 22 and the winding of the coil is more compact.

In an embodiment, the first support 1, the second support 2 and the third support 3 are formed integrally.

It can be understood that the wire slot 20 comprises an opening and a bottom wall disposed opposite to the opening, a portion of the bottom wall of the wire slot 20 inclines towards the bottom direction of the second support 2 to form the inclined portion 22; moreover, the inclined portion 22 is provided at the side of the wire slot 20 facing the first support 1, i.e., the inclined portion 22 is provided at the inner side of the first support 1. That is, the upper half portion of the wire slot 20 approximately presents a U shape, the opening is located in the U-shaped top, the lower half portion of the wire slot 20 presents a sloping shape, so that the coil is more compact when the wire crosses, and the fixing performance of the winding of the coil is improved.

In an embodiment, when the insulating framework is used in the stator, the first support 1 is close to the inner side of the stator core 4, the second support 2 is close to the outer side of the stator core 4, and the third support 3 is connected with and located between the first support 1 and the second support 2.

Figure 3:
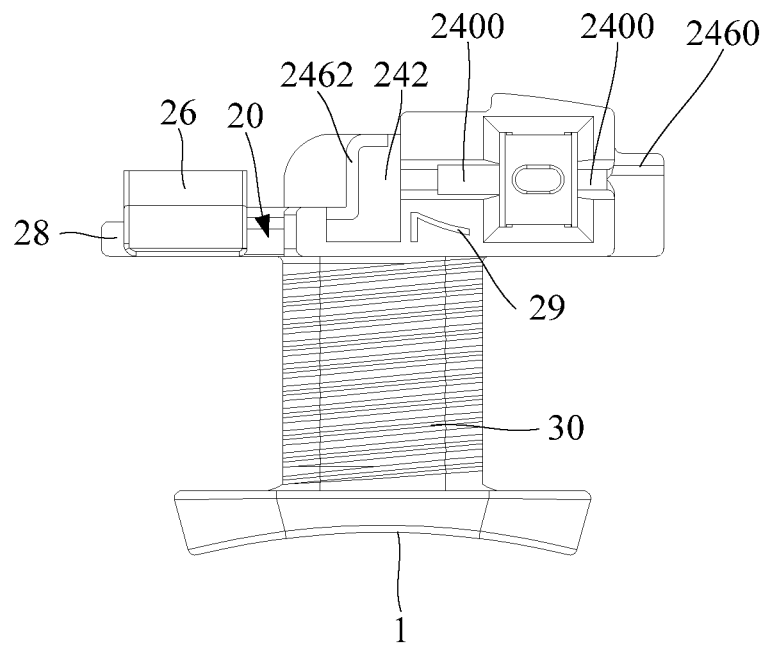
FIG. 3 shows a schematic view of the structure of the insulating framework according to an embodiment of the present disclosure.
Figure 4:
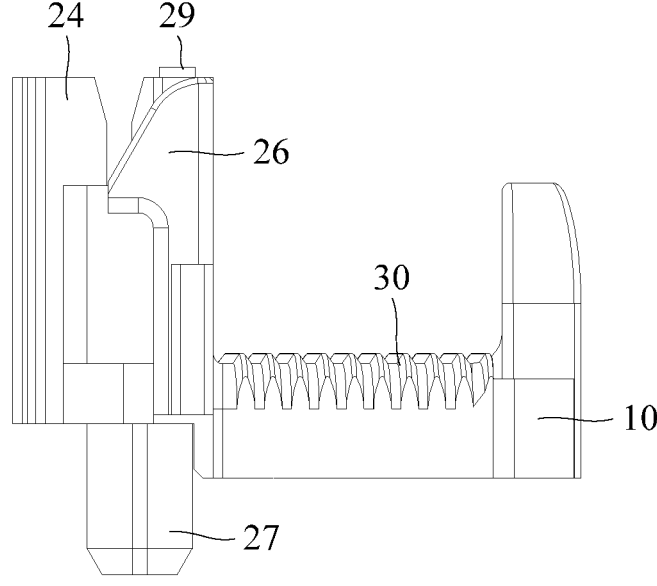
FIG. 4 shows a schematic view of the structure of the insulating framework according to an embodiment of the present disclosure.

As shown in FIG. 3 and FIG. 4, the insulating framework further comprises a terminal accommodating portion 24, the terminal accommodating portion 24 is provided at the side of the second support 2 away from the first support land is used for accommodating a crimp terminal, and along a first direction, the terminal accommodating portion 24 is located at the first side of the wire slot 20.

In the embodiment, the insulating framework further comprises the terminal accommodating portion 24, the terminal accommodating portion 24 is provided on the second support 2, the crimp terminal is provided inside the terminal accommodating portion 24, in-phase coils are connected inside the terminal accommodating portion 24 through the crimp terminal, so that the in-phase coils are in series connection. And the terminal accommodating portion 24 is provided at the side of the second support 2 away from the first support 1, and thus this avoids occupying the winding space of the coils. Meanwhile, the terminal accommodating portion 24 and the wire slot 20 are distributed along the first direction, and this facilitates the winding of the coils and the series connection of the in-phase coils. In addition, through disposing an accommodating groove 240 in the insulating framework, other in-phase structures in electrical connection are prevented from being stacked on the insulating framework, and the integral dimension of the stator is further reduced.

And the first direction is the circumferential direction of the stator core 4.

As shown in FIG. 1 and FIG. 3, the terminal accommodating portion 24 can further comprise: an accommodating groove 240 for accommodating the crimp terminal, and a notch 2400 is provided in the accommodating groove 240, and the notch 2400 is located in the side wall of the accommodating groove 240 along the first direction; a glue overflow groove 242, and along the first direction, the glue overflow groove 242 is located at the two sides of the accommodating groove 240, and the glue overflow groove 242 is in communication with the notch 2400.

In the embodiment, the terminal accommodating portion 24 comprises the accommodating groove 240 and the glue overflow groove 242, the accommodating groove 240 is used for accommodating the crimp terminal of the stator, and the notch 2400 is provided in the accommodating groove 240, the wire head and the wire tail of in-phase coils extend into the accommodating groove 240 through the notch 2400 at one side of the accommodating groove 240, which plays the role of positioning the coils and ensures the stability of the coils, and meanwhile, the electrical connection of the in-phase coils is achieved through the crimp terminal.

In addition, the glue overflow groove 242 is provided at the two sides of the accommodating groove 240 and is in communication with the notch 2400, and thus, after the in-phase coils are electrically connected through a connecting terminal, the coils are sealed through a sealant at the accommodating groove 240 and the notch 2400, and this improves the safety performance of the coils, and moreover, due to the arrangement of the glue overflow groove 240, in the process of using the sealant to seal the crimp terminal, redundant sealant will be blocked by the glue overflow groove 242, so that the sealant will not overflow to the outer side of the terminal accommodating portion 24, to achieve relatively good sealing for the coils.

Two notches 2400 can be provided in the accommodating groove 240, the two notches 2400 are respectively provided in the two side walls of the accommodating groove 240 in the first direction. Likewise, the number of the glue overflow grooves 242 is two, and the two glue overflow grooves 242 are respectively provided corresponding to the two notches 2400, so that the overflow of the sealant at the two notches 2400 can be prevented through the glue overflow grooves 242 when sealing is conducted at the two notches 2400.

It can be understood that when the crimp terminal and the cut section of a conducting wire are sealed, if a sealant with a low viscosity is used, the sealant can easily flow away along the side wall of the accommodating groove 240, and thus it is difficult to achieve complete sealing to the crimp terminal and the cut section of the conducting wire. If a sealant with a high viscosity is used, as the flowability of the sealant is not high and the notches 2400 of the accommodating groove 240 are relatively narrow, it is difficult to cover them completely. Therefore, through disposing the glue overflow grooves 242 according to the present disclosure, the overflow of the sealant is prevented, and the complete sealing to the crimp terminal and the cut section of the conducting wire of the coil is achieved.

As shown in FIG. 2 and FIG. 3, the terminal accommodating portion 24 can further comprise: a glue overflow table

244, and the glue overflow table 244 is provided at the two sides of the accommodating groove 240 along the first direction; and a lug boss 246, provided on the glue overflow table 244, and the glue overflow groove 242 is enclosed at least by the lug boss 246 and the glue overflow table 244.

In the embodiment, the terminal accommodating portion 24 further comprises the glue overflow table 244 and the lug boss 246, the glue overflow table 244 is provided at the two sides of the accommodating groove 240, i.e., the protruding glue overflow table 244 is provided at the two sides of the accommodating groove 240 in the first direction, and the lug boss 246 is provided on the glue overflow table 244, so that the glue overflow groove 242 is enclosed at least by the glue overflow table 244 and the lug boss 246, and thus at least a portion of the notches 2400 are surrounded by the glue overflow groove 242, and furthermore, redundant sealant can flow into the glue overflow groove 242 when the sealant is poured into the accommodating groove 240 and the notches 2400 for sealing, and then the sealant is prevented from overflowing the terminal accommodating portion 24.

It can be understood that the crimp terminal pierces the coils so that the in-phase coils are connected.

The crimp terminal can be a piercing terminal, and thus the crimp terminal can pierce the insulating coating on the surface of the coils in the process of compressing the coils within the accommodating groove 240, to achieve the electrical connection of the in-phase coils and thus achieving rapid connection.

Furthermore, as shown in FIG. 2, the lug boss 246 comprises: a first bump 2460, provided at the side of the accommodating groove 240 away from the wire slot 20, and the first bump 2460 is located at the side of the notch 2400 away from the first support 1; and a second bump 2462, provided at the side of the accommodating groove 240 close to the wire slot 20, wherein the glue overflow groove 242 is enclosed by the second bump 2462, the second support 2 and the accommodating groove 240, and a gap is provided between the second bump 2462 and the accommodating groove 240.

In the embodiment, the lug boss 246 comprises the first bump 2460 and the second bump 2462, and the first bump 2460 and the second bump 2462 are respectively provided on the glue overflow tables 244 on the two sides of the accommodating groove 240, and the first bump 2460 is located at the side of the accommodating groove 240 away from the wire slot 20, and located at the side of the notch 2400 away from the first support 1, and thus, the redundant sealant can be blocked by the first bump 2460 when the sealant is poured into the accommodating groove 240 and the notches 2400, to avoid the overflow of the sealant.

The second bump 2462 is provided at the side of the accommodating groove 240 close to the wire slot 20, and the glue overflow groove 242 is enclosed by the second bump 2462, the surface of the second support 2 and the outer side wall surface of the accommodating groove 240, and the end portion of the second bump 2462 and the wall surface of the accommodating groove 240 are not completely closed therebetween and have a gap, and this helps the cutting and sealing of the wire tail of the coil.

The wire slot 20 can be provided in the bottom of the first bump 2460 and the wire slot 20 is disposed opposite to the notches 2400, so that the coil can be further fixed in the wire slot 20, to improve the fixing performance of the coil.

In addition, the dimension of the gap is relatively small, which prevents the sealant from flowing out. In an embodiment, the width of the gap is greater than or equal to 1 mm, and is less than or equal to 5 mm.

Figure 5:
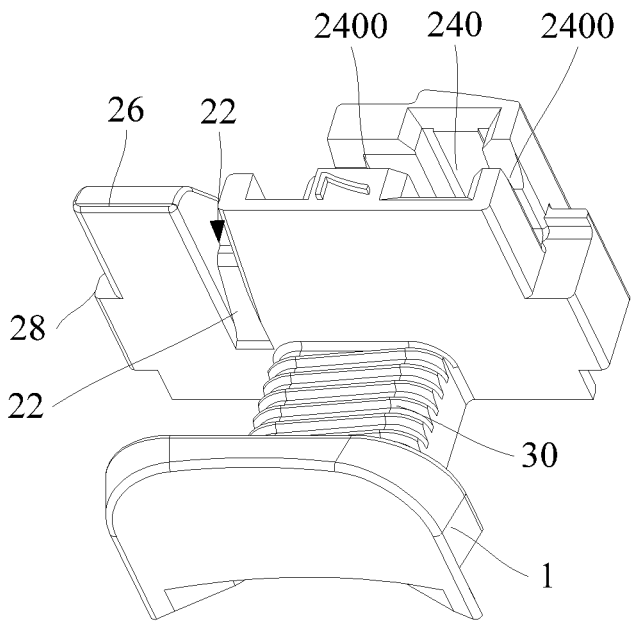
FIG. 5 shows a schematic view of the structure of the insulating framework according to an embodiment of the present disclosure.

As shown in FIG. 5, the notch 2400 comprises a first channel 2402 and a second channel 2404 which are in communication, the first channel 2402 is located on the top of the second channel 2404, and the side wall of the first channel 2402 is provided gradually expanding towards the two sides of the first channel 2402.

In the embodiment, the notch 2400 comprises the first channel 2402 and the second channel 2404 which are in communication, i.e., the notch 2400 is divided into an upper half portion and a lower half portion, and the first channel 2402 is located at the upper half portion, the second channel 2404 is located at the lower half portion, and the upper half portion is in communication with the lower half portion, and the side wall of the first channel 2402 is arranged expanding gradually to help pass the wire at the notch 2400; meanwhile, the inclining arrangement of the upper half portion of the notch 2400 can further help the pouring of the sealant, so that the sealant can flow towards the bottom of the notch 2400 along the wall surface arranged inclinedly, to improve the sealing effect of the sealant to the cut section of the coil.

The notch 2400 can approximately present a U shape, the side wall of the first channel 2402 can present a sloping shape, the side wall of the second channel can be approximately straight.

According to an embodiment of the present disclosure, the width of the wire slot 20 is greater than that of the notch 2400.

In the embodiment, both the wire head and the wire tail of the coil are provided in the notch 2400, which helps the coil enter into the groove, the width of the wire slot 20 is greater than that of the notch 2400, so that the wire head and the wire tail are in more compact connection with the notch 2400 when entering into the notch 2400, to improve the fixing performance of the notch 2400 to the coil.

For example, the width of the wire slot 20 is further the width of the wire slot 20 along the first direction, and the width of the notch 2400 is further the width of the notch 2400 along a second direction. In an embodiment, both the wire slot 20 and the notch 2400 approximately present a U shape, and the width of the wire slot 20 and the width of the notch 2400 are further the distance between the U-shaped side walls at the left and right sides.

Through the above arrangement of the widths of the notch 2400 and the wire slot 20, on the one hand, the notch 2400 can accommodate both the wire head and the wire tail of the coil at the same time, and on the other hand can improve the tightness of the coil.

Figure 6:
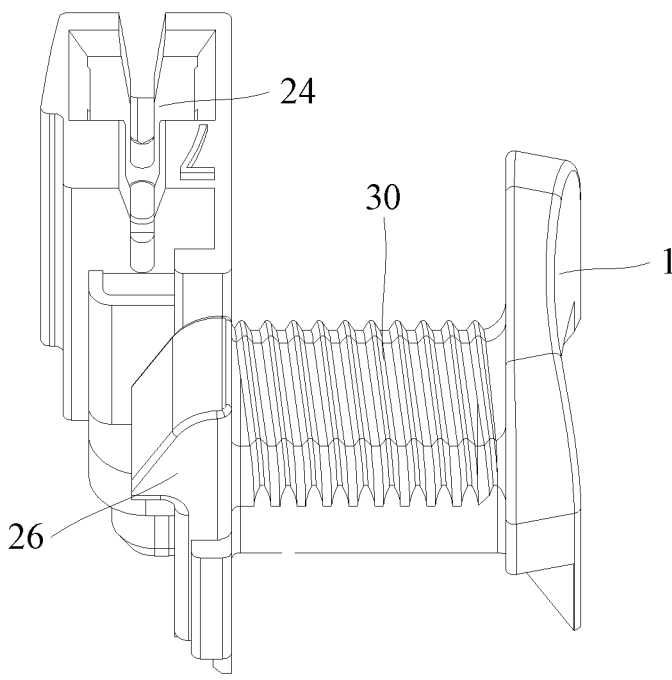
FIG. 6 shows a schematic view of the structure of the insulating framework according to an embodiment of the present disclosure.
Figure 7:
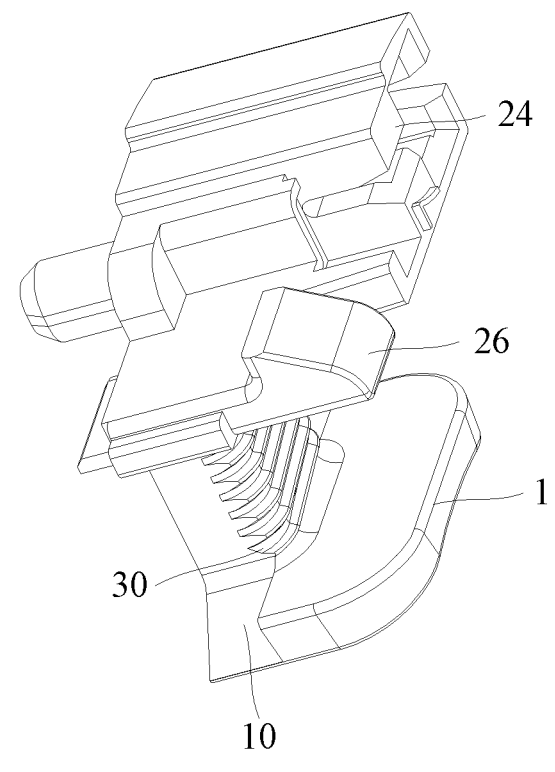
FIG. 7 shows a schematic view of the structure of the insulating framework according to an embodiment of the present disclosure.
Figure 9:
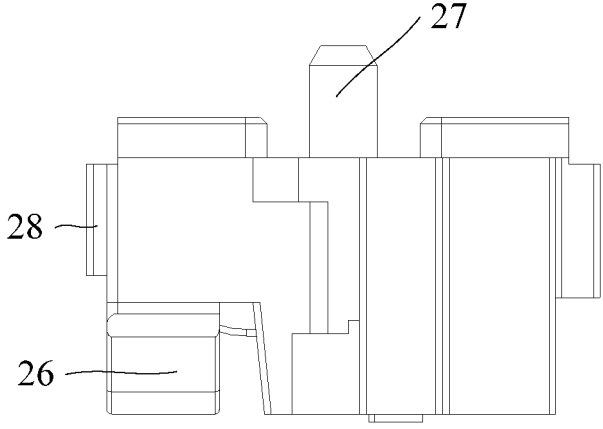
FIG. 9 shows a schematic view of the structure of the insulating framework according to an embodiment of the present disclosure.

As shown in FIG. 6, FIG. 7 and FIG. 9, the insulating framework further comprises a protruding portion 26, provided at the side of the second support 2 away from the first support 1, and along the first direction, the protruding portion 26 is located at a second side of the wire slot 20.

In the embodiment, the insulating framework further comprises the protruding portion 26, the protruding portion 26 is provided on the second support 2 and located at the side of the second support 2 away from the first support 1 and the third support 3; the protruding portion 26, the wire slot 20 and the terminal accommodating portion 24 are arranged sequentially along the first direction, and the arrangement of the protruding portion 26 can play the role of limiting the coil, and preventing the coil from escaping; and in an embodiment, the arrangement of the protruding portion 26 can prevent the escaping of the wire tail of the coil and improve the fixing performance of the coil.

In an embodiment, for block cores, each block core is wound with a coil, each coil comprises a wire head and a wire tail, and after accomplishing the winding, the wire tail extends into the wire slot 20 through the bottom of the protruding portion 26, and the coil is limited through the wire slot 20.

It can be understood that along the first direction, the wire slot 20 comprises a first side and a second side; the first side of the wire slot 20 and the second side of the wire slot 20 are two sides of the wire slot 20 disposed opposite to each other, and the side of the wire slot 20 close to the terminal accommodating portion 24 is the first side of the wire slot 20, and the side of the wire slot 20 close to the protruding portion 26 is the second side of the wire slot 20.

As shown in FIG. 6 and FIG. 7, according to an embodiment of the present disclosure, at least a portion of the top wall of the protruding portion 26 inclines towards the bottom of the second support 2.

In the embodiment, at least a portion of the top wall of the protruding portion 26 inclines towards the bottom of the second support 2, on the one hand, it decreases the materials used by the protruding portion 26 and reduces the production cost, and on the other hand, it prevents the interference to other structures when the insulating framework is used in cooperation with other structures.

The cross section of the protruding portion 26 can approximately present a triangular shape.

For example, the motor comprises the stator core 4, the insulating framework and an insulating cover plate 6; the insulating framework is provided at the two ends of the stator core 4, and the insulating cover plate 6 is provided at the two ends of the insulating framework away from the stator core 4. The insulating cover plate 6 plays the role of insulating, and improves the safety performance of the motor. And the protruding portion 26 is in buckling connection with the insulating cover plate 6, so that the insulating framework is connected with the insulating cover plate 6, to improve the reliability of the connection between the insulating cover plate 6 and the insulating framework.

It can be understood that both the insulating cover plate 6 and the insulating framework are made by insulating materials.

Furthermore, the surface of the protruding portion 26 close to the bottom of the second support 2 is located at the side of the bottom wall of the wire slot 20 away from the bottom of the second support 2.

In the embodiment, the surface of the protruding portion 26 close to the bottom of the second support 2 is located at the side of the bottom wall of the wire slot 20 away from the bottom of the second support 2; through the above arrangement, the surface of the protruding portion 26 close to the bottom of the second support 2 is higher than the bottom wall of the wire slot 20, that is, the bottom wall of the wire slot 20 is lower than the lower surface of the protruding portion 26, and furthermore, the wire tail of the coil is wound from the side of the protruding portion 26 away from the wire slot 20 towards the wire slot 20, which can prevent the coil from bending at the wire slot 20 and further make the wiring of the coil more compact.

In an embodiment, the distance between the lower surface of the protruding portion 26 and the bottom wall of the wire slot 20 is larger than or equal to the diameter of the conducting wire in the coil. It can be understood that the coil is formed by winding a conducting wire around the block core and the insulating framework.

Furthermore, the length of the terminal accommodating portion 24 protruding out of the second support 2 is greater than the length of the protruding portion 26 protruding out of the second support 2.

In the embodiment, both the terminal accommodating portion 24 and the protruding portion protrude out of the second support 2 towards the side away from the first support 1, and the length of the protruding portion protruding out of the second support 2 is less than the length of the terminal accommodating portion 24 protruding out of the second support 2, and thus, when the insulating framework is connected with the insulating cover plate 6, this avoids interference to the connection between the insulating framework and the insulating cover plate 6, and ensures the reliability of their connection.

It can be understood that the second support 2, the third support 3 and the first support 1 are sequentially distributed along the second direction, and the length of the protruding portion along the second direction is less than the length of the terminal accommodating portion 24.

It can be understood that the second direction is the radial direction of the stator core 4.

As shown in FIG. 5 and FIG. 9, the insulating framework further comprises a step portion 28 provided on the second support 2, and the step portion 28 is located at the side of the protruding portion 26 away from the wire slot 20.

In the embodiment, the insulating framework further comprises the step portion 28, the step portion 28 is provided on the second support 2 for bearing the coil, and in an embodiment, the step portion 28 is configured to bear the wire tail of the coil. The tightness of the winding of the coil is improved.

In an embodiment, the step portion 28 is provided at the side of the protruding portion 26 away from the wire slot 20, and thus, the wire tail of the coil is wound from the upper surface of the step portion 28 to below the protruding portion 26, and further extends into the wire slot 20, and the wire tail of the coil is fixed through the wire slot 20.

As shown in FIG. 1 to FIG. 7, the third support 3 is provided with a plurality of auxiliary grooves 30, any of the auxiliary grooves 30 extends along the first direction, the plurality of auxiliary grooves 30 are distributed along the second direction, and the first support 1, the third support 3 and the second support 2 are sequentially distributed along the second direction.

In the embodiment, the third support 3 is provided with the auxiliary grooves 30, the number of the auxiliary grooves 30 is multiple, the coil is fixed through the auxiliary grooves 30, to improve the tightness and stability of the winding of the coil. And each auxiliary groove 30 extends along the first direction, the plurality of auxiliary grooves 30 are distributed in array along the second direction, and the coil is wound around the insulating framework by the auxiliary grooves 30.

In an embodiment, the auxiliary grooves 30 are provided on the upper surface of the third support 3, and the auxiliary grooves 30 are cut flatly by the side surface of the third support 3 directly when extending naturally along the outer surface of the third support 3.

As shown in FIG. 4, the edge of the inclined portion 22 close to the bottom of the second support 2 is approximately flush with the bottom of the auxiliary grooves 30.

In the embodiment, the edge of inclined portion 22 close to the bottom of the second support 2 is approximately aligned with the bottom of the auxiliary grooves 30, and this prevents the bending of the coil and ensures the tightness of the winding of the coil.

It can be understood that the edge of the inclined portion 22 which is close to the bottom of the second support 2 is the lower edge of the inclined portion 22. The lower edge of the inclined portion 22 is approximately flush with the bottom of the auxiliary grooves 30, that is, the lower edge of the inclined portion 22 is flush with the bottom of the auxiliary grooves 30, or the lower edge of the inclined portion 22 is slightly higher than the bottom of the auxiliary grooves 30.

Furthermore, the wall surface of the wire slot 20 close to the terminal accommodating portion 24 is approximately flush with the wall surface of the third support 3 close to the wire slot 20.

In the embodiment, the wall surface of the wire slot 20 close to the terminal accommodating portion 24 is approximately flush with the wall surface of the third support 3 close to the wire slot 20, and thus, when the coil is wound from the wire slot 20 to the third support 3, the winding of the coil is more compact, to improve the slot fill factor of the stator core 4.

It can be understood that the wall surface of the wire slot 20 close to the terminal accommodating portion 24 is approximately flush with the wall surface of the third support 3 close to the wire slot 20, that is, the wall surface of the wire slot 20 close to the accommodating portion is flush with the wall surface of the third support 3 close to the wire slot 20, or there is a tiny distance between the wall surface of the wire slot 20 close to the accommodating portion and the wall surface of the third support 3 close to the wire slot 20.

As shown in FIG. 7, the side of the first support 1 facing the second support 2 is provided with a cut 10, the cut 10 is arranged close to the bottom of the first support 1, and along the first direction, the cut 10 is located at the two sides of the third support 3.

In the embodiment, the first support 1 is disposed with the cut 10, the cut 10 is located at the inner side of the first support 1, and this can evade the winding of the coil, and ensures the tightness of the winding of the coil.

In an embodiment, the cut 10 is located at the side of the first support 1 facing the second support 2, and provided close to the bottom of the first support 1; and, furthermore, along the first direction, the cut 10 is disposed at the two sides of the third support 3, and thus this can decrease the integral weight of the insulating framework, reduce the production cost, and can further prevent affecting the winding of the coil due to excessive compressing to the coil by the third support 3.

For example, the wall surface of the first support 1 facing the second support 2 is approximately a plane, the wall surface of the first support 1 away from the second support 2 is arc-shaped, and furthermore, when the insulating framework is used in the stator, the first support 1 can enclose a ring shape to adapt to the shape of the tooth portion of the stator, and this is convenient for the loading and moving of the rotor. Meanwhile, due to the arrangement of the cut 10, the shape of the first support 1 can adapt to the end of the tooth portion of the stator facing the interior of the stator, and this increases the slot fill factor of the stator and meanwhile makes the integral connection more compact.

In an embodiment, the cut 10 is a flat and non-through structure.

Furthermore, the side of the cut 10 close to the top of the first support 1 is flush with the top of the auxiliary grooves 30.

In the embodiment, the side of the cut 10 close to the top of the first support 1 is flush with one side of the top of the auxiliary grooves 30, and this ensures the effect of evading the coil by the cut 10, and increases the slot fill factor of the stator.

As shown in FIG. 1 to FIG. 5, the insulating framework further comprises a marker 29 provided on at least one of the second support 2 and the first support 1, and the marker 29 corresponds to the width of the notch 2400 of the terminal accommodating portion 24 and the width of the auxiliary groove 30 of the third support 3.

In the embodiment, the insulating framework further comprises the marker 29, the marker 29 is provided on at least one of the second support 2 and the first support 1, and it can be understood that winding different stators will correspond to different coil diameters, and further correspond to different widths of the auxiliary groove 30 and different widths of notch 2400, that is, the diameter of the coil is in one-to-one correspondence with the width of the notch 2400 and the width of the auxiliary groove 30, and therefore, the diameter of the coil varies synchronously with the width of the notch 2400 and the width of the auxiliary groove 30; therefore, according to the embodiment proposed by the present disclosure, the marker 29 is provided on the insulating framework, and the marker 29 is in one-to-one correspondence with the diameter of the coil, the width of the notch 2400 and the width of the auxiliary groove 30, and this can be configured to select different insulating frameworks based on the markers 29 according to different coil diameters; in an embodiment, different insulating frameworks correspond to different dimensions of the width of notch 2400 and the width of the auxiliary groove 30, and then the insulating frameworks of multiple dimensions and speculations can adapt to coils of different dimensions.

In an embodiment, the width of the notch 2400 and the yoke width of the auxiliary groove 30 have multiple dimensions, and can be selected and used according to actual conditions.

In an embodiment, the marker 29 can be a number, a letter or a symbol with the same function.

For example, the marker 29 is provided at the terminal accommodating portion 24 of the second support 2, and furthermore, the marker 29 is provided on the top of the terminal accommodating portion 24 for the convenience of users' identification.

Figure 10:
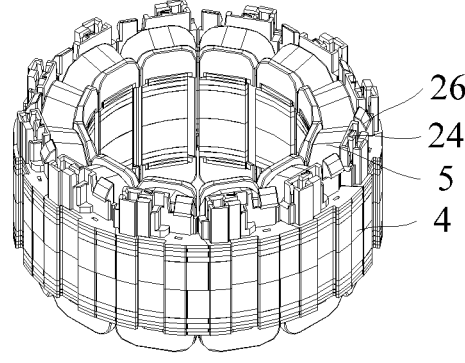
FIG. 10 shows a schematic view of the structure of a stator according to an embodiment of the present disclosure.
Figure 11:
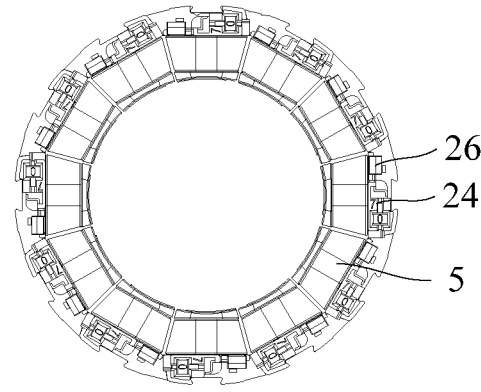
FIG. 11 shows a schematic view of the structure of the stator according to an embodiment of the present disclosure.

As shown in FIG. 10 and FIG. 11, the second aspect according to the present disclosure further proposes a stator, including: a stator core 4, and the stator core 4 comprises a plurality of block cores connected in sequence, the block cores comprise tooth portions, and a stator groove is enclosed by the tooth portions of two adjacent block cores; an insulating framework according to in any of the first aspect, and the number of the insulating frameworks is multiple, the two ends of any of the block cores are provided with the insulating frameworks, and the third support 3 is disposed opposite to the tooth portions; and a winding 5, and the winding 5 is wound around the tooth portions and the insulating frameworks.

The stator proposed by the second aspect of the present disclosure comprises the insulating framework proposed by any of the embodiments in the first aspect, and thus has all the beneficial effect of the insulating framework.

Furthermore, the stator comprises the stator core 4, the stator core 4 comprises a plurality of block cores connected in sequence, the block cores comprise the tooth portions, and the stator groove is enclosed between the tooth portions of two adjacent block cores for accommodating the winding 5, and both ends of each of the block cores are provided with the insulating frameworks, so that the winding 5 can be wound around the tooth portions and the insulating frameworks, and the insulating performance is ensured. Meanwhile, by this winding method, the electrical connection of in-phase windings 5 can be achieved on the insulating framework, and it is not necessary to stack other structures for achieving the electrical connection, to further lower the axial height of the stator and making the ends of the stator more compact.

Furthermore, the winding 5 comprises a plurality of coils, one of the coils is wound around one of the block cores and the insulating frameworks at the two ends of the block core, the coil comprises a wire head and a wire tail, and the wire slot 20 is configured to accommodate the wire head and the wire tail.

In the embodiment, the winding 5 comprises a plurality of coils, one block core and the insulating frameworks at the two ends of the block core constitute a core component, and each core component is wound with one coil, and after each coil is wound, the plurality of core components are rounded to form the stator, and thus, this can prevent scratching the insulating layer on the surface of the coil while the slot fill factor is improved.

The coil comprises a wire head and a wire tail, and the wire slot 20 is configured to accommodate the wire head and the wire tail, to ensure the tightness of the winding of the coil.

In an embodiment, the wire head is buckled in the wire slot 20 in one end of the stator core 4 in the axial direction, then extends towards the other end of the stator core 4, and starts to wind from the side of the insulating framework away from the wire slot 20, so that the wire tail is located at the side of the insulating framework close to the wire slot 20, and then, the wire tail is wound to the step portion 28, then extends to below the protruding portion 26 via the upper surface of the step portion 28, further extends into the wire slot 20, and is pre-fixed in the wire slot 20. When all the coils are wound, the plurality of block cores are rounded to form the stator; compared with the prior art, the embodiment proposed in the present disclosure can not only improve the slot fill factor of the stator, but further prevent causing damage to the insulating layer of the coil itself.

Furthermore, the stator further comprises an insulating cover plate 6, and the insulating cover plate 6 is provided at the side of the insulating framework away from the stator core 4, and the insulating cover plate 6 is in buckling connection with the protruding portion 26 of the insulating framework.

In the embodiment, the insulating framework further comprises the insulating cover plate 6, the insulating cover plate 6 is provided at the side of the insulating framework away from the stator core 4, and through disposing the insulating framework, the insulating protection for the two ends of the coil can be achieved, and the safety performance of the stator is improved. And the insulating cover plate 6 is connected with the protruding portion 26 of the insulating framework, and this achieves fixing the insulating cover plate 6, so that the integral structure of the stator is more compact and the effective locking of the two is achieved.

Furthermore, the insulating cover plate 6 is in buckling connection with the protruding portion 26 of the insulating framework.

Figure 12:
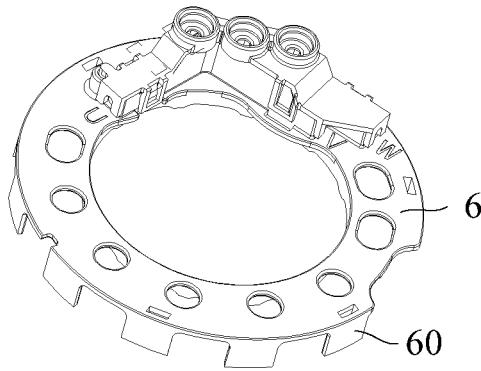
FIG. 12 shows a schematic view of the structure of an insulating cover plate according to an embodiment of the present disclosure.

For example, as shown in FIG. 12, the insulating cover plate 6 is provided with a buckle 60, the buckle 60 is in buckling connection with the protruding portion 26. It can be understood that the length of the protruding portion 26 is less than the length of the terminal accommodating portion 24, and therefore, the buckling connection between the buckle 60 and the protruding portion 26 is ensured.

Furthermore, any of the block cores comprises a plurality of punching sheets, and the plurality of punching sheets are laminated along the axial direction of the stator core 4.

In the embodiment, it is arranged that each block core comprises a plurality of punching sheets, and the plurality of punching sheets are laminated along the axial direction of the stator core 4, and thus, an overlapping portion is formed at the circumferential edge of the punching sheets; when the plurality of punching sheets are laminated along the axial direction of the core, an overlapping gap is defined between adjacent punching sheets and formed in the stator groove, and it is convenient to wind the winding 5 around the tooth portion of the stator core 4 and locate the winding inside the stator groove.

In an embodiment, the punching sheet is a silicon steel sheet.

Furthermore, two adjacent block cores are rotatably connected through the overlapping portion.

In the embodiment, two adjacent block cores are rotatably connected through the overlapping portion, i.e., the two block cores after connection can rotate relative to each other.

Through rotatably connect the two adjacent block cores through the overlapping portion, one block core can be made to rotate around the other block core with the connecting point of the overlapping portion as the center of a circle, and this connecting method is simple and reliable, and helps operators conduct adjustments to the shape and the structure of the stator core 4, and the position of the block core can be adjusted according to the needs in use.

Furthermore, the stator core 4 comprises a tooth portion and a yoke portion, and the stator core 4 at least comprises a first state and a second state; in the first state, the plurality of block cores are rounded to form a first ring, and the tooth portions are located at the inner side of the yoke portion; and in the second state, the plurality of block cores unfold to approximately present a straight-line form.

In the embodiment, the stator core 4 comprises the first state, the first state is a conventional state after the winding 5 is wound around the stator core 4; in the first state, the plurality of block cores are rounded to form the first ring, and the tooth portions are located at the inner side of the yoke portion. Under this state, the winding 5 is wound in the stator groove constituted by adjacent tooth portions, and the winding 5 is close to the inner side of the stator core 4, and two adjacent stator cores 4 are rotatably connected to each other through the overlapping portion provided on the yoke portion at the outer side, and jointly enclose a circular stator core 4.

The stator core 4 further comprises the second state; since two adjacent block cores are in rotatable connection, when two adjacent block cores in the stator core 4 move relative to each other, the plurality of block cores can unfold to approximately present a straight-line form. The tooth portions of the unfolded block cores are distributed approximately in a straight-line form, since the stator core 4 is in an unfolded state, the space of the stator groove between two tooth portions increases to a certain extent compared with the first state, and this helps operators wind the winding 5.

Through putting the stator core 4 in the second state, the tooth portions can be made to approximately present a straight-line distribution, and the space of the stator groove is made to increase, to help the operators wind the winding 5. After accomplishing the operation of winding the winding 5, the stator core 4 is enclosed into the first state, so that the block cores enclose a circular stator core 4, to make the structure of the stator core 4 stable and reliable.

Furthermore, in the second state, two block cores at the two ends are connected to each other after the rounding, and in an embodiment, the two block cores can be welded after the rounding.

It can be understood that the stator core 4 approximately presents a straight-line form in the second state, including the situations that the stator core 4 presents a straight-line form, or the stator core 4 has a certain radian.

Furthermore, the plurality of punching sheets comprise a first punching sheet layer and a second punching sheet layer which are arranged alternatively; the first side of the first punching sheet layer is provided with an overlapping portion, the overlapping portion on the first punching sheet layer protrudes out of the second punching sheet layer, and an overlapping gap is enclosed by two adjacent first punching sheet layers; the second side of the second punching sheet layer is provided with an overlapping portion, the overlapping portion on the second punching sheet layer protrudes out of the first punching sheet layer, and an overlapping gap is enclosed by two adjacent second punching sheet layers; for two adjacent block cores, the overlapping portion of one block core is inserted into the overlapping gap of the other block core.

In the embodiment, the plurality of punching sheets comprise the first punching sheet layer and the second punching sheet layer, and a plurality of the first punching sheet layers and a plurality of the second punching sheet layers are distributed alternatively along the axial direction of the stator core 4. The first punching sheet layer is provided with an overlapping portion at the first side, and the overlapping portion on the first punching sheet layer protrudes out of the second punching sheet layer; since the plurality of the first punching sheet layers and the plurality of the second punching sheet layers are arranged alternatively, both of two adjacent first punching sheet layers protrude out of the second punching sheet layer provided in the middle of the two adjacent first punching sheet layers, so that an overlapping gap is enclosed between the two adjacent first punching sheet layers. The second punching sheet layer is provided with an overlapping portion at the second side, that is, the second punching sheet layer is provided with the overlapping portion at the side different from the first punching sheet layer. The overlapping portion on the second punching sheet layer protrudes out of the first punching sheet layer; since the plurality of the first punching sheet layers and the plurality of the second punching sheet layers are arranged alternatively, both of two adjacent second punching sheet layers protrude out of the first punching sheet layer arranged in the middle of the two adjacent punching sheet layers, so that the overlapping gap can further be enclosed between the two adjacent second punching sheet layers.

It can be understood that the overlapping portions of the plurality of the first punching sheet layers disposed at the first side and the overlapping portions of the plurality of the second punching sheet layers disposed at the second side are in an interlacing arrangement when the plurality of the first punching sheet layers and the plurality of the second punching sheet layers are distributed alternatively along the circumferential direction of the stator core 4. Furthermore, the overlapping gap located between two adjacent first punching sheet layers and the overlapping gap located between two adjacent second punching sheet layers are respectively located at the two sides of the block core and are in an interlacing arrangement.

An overlapping portion and an overlapping gap are respectively provided at the sides of two adjacent block cores close to each other, since the overlapping portions of the plurality of the first punching sheet layers disposed at the first side and the overlapping portions of the plurality of the second punching sheet layers disposed at the second side are in interlacing arrangement, and the overlapping gap located between two adjacent first punching sheet layers and the overlapping gap located between two adjacent second punching sheet layers are in interlacing arrangement, the overlapping portion of one block core is inserted into the overlapping gap of another block core, to achieve the connection of two adjacent block cores.

Through alternatively arranging the first punching sheet layers and the second punching sheet layers, arranging the overlapping portions respectively at different sides of the first punching sheet layers and the second punching sheet layers, and enclosing the overlapping gaps at different sides through the first punching sheet layers and the second punching sheet layers, two adjacent block cores can be connected through the overlapping portion and the overlapping gap, and in an embodiment, the overlapping portion of one block core is inserted into the overlapping gap of the other block core. This connecting method is stable and reliable, and an operator can disassemble and assemble the stator core 4 rapidly, and then the work efficiency is improved. The mutual connection can be achieved as long as the plurality of block cores adopt the same structure, the categories of the block cores are decreased, the universality of the block cores are improved, and the product cost is reduced.

Furthermore, the plurality of punching sheets comprise a first punching sheet layer and a second punching sheet layer which are arranged alternatively; the first side of the first punching sheet layer is provided with an overlapping portion, the overlapping portion on the first punching sheet layer protrudes out of the second punching sheet layer, and an overlapping gap is enclosed by two adjacent first punching sheet layers; the second side of the second punching sheet layer is provided with an overlapping portion, the overlapping portion on the second punching sheet layer protrudes out of the first punching sheet layer, and an overlapping gap is enclosed by two adjacent second punching sheet layers; for two adjacent block cores, the overlapping portion of one block core is inserted into the overlapping gap of the other block core.

In the embodiment, the plurality of punching sheets comprise the first punching sheet layer and the second punching sheet layer, and a plurality of the first punching sheet layers and a plurality of the second punching sheet layers are distributed alternatively along the axial direction of the stator core 4. The first punching sheet layer is provided with an overlapping portion at the first side, and the overlapping portion on the first punching sheet layer protrudes out of the second punching sheet layer; since the plurality of the first punching sheet layers and the plurality of the second punching sheet layers are arranged alternatively, both of two adjacent first punching sheet layers protrude out of the second punching sheet layer provided in the middle of the two adjacent first punching sheet layers, so that an overlapping gap is enclosed between the two adjacent first punching sheet layers. The second punching sheet layer is provided with an overlapping portion at the second side, that is, the second punching sheet layer is provided with the overlapping portion at the side different from the first punching sheet layer. The overlapping portion on the second punching sheet layer protrudes out of the first punching sheet layer; since the plurality of the first punching sheet layers and the plurality of the second punching sheet layers are arranged alternatively, both of two adjacent second punching sheet layers protrude out of the first punching sheet layer arranged in the middle of the two adjacent second punching sheet layers, so that the overlapping gap can further be enclosed between the two adjacent second punching sheet layers.

It can be understood that the overlapping portions of the plurality of the first punching sheet layers disposed at the first side and the overlapping portions of the plurality of the second punching sheet layers disposed at the second side are in an interlacing arrangement when the plurality of the first punching sheet layers and the plurality of the second punching sheet layers are distributed alternatively along the circumferential direction of the stator core 4. Furthermore, the overlapping gap located between two adjacent first punching sheet layers and the overlapping gap located between two adjacent second punching sheet layers are respectively located at the two sides of the block core and are in an interlacing arrangement.

An overlapping portion and an overlapping gap are respectively provided at the sides of two adjacent block cores close to each other, since the overlapping portions of the plurality of the first punching sheet layers disposed at the first side and the overlapping portions of the plurality of the second punching sheet layers disposed at the second side are in interlacing arrangement, and the overlapping gap located between two adjacent first punching sheet layers and the overlapping gap located between two adjacent second punching sheet layers are in interlacing arrangement, the overlapping portion of one block core is inserted into the overlapping gap of another block core, to achieve the connection of two adjacent block cores.

Through alternatively arranging the first punching sheet layers and the second punching sheet layers, arranging the overlapping portions respectively at different sides of the first punching sheet layers and the second punching sheet layers, and enclosing the overlapping gaps at different sides through the first punching sheet layers and the second punching sheet layers, two adjacent block cores can be connected through the overlapping portion and the overlapping gap, and in an embodiment, the overlapping portion of one block core is inserted into the overlapping gap of the other block core. This connecting method is stable and reliable, and an operator can disassemble and assemble the stator core 4 rapidly, and then the work efficiency is improved. The mutual connection can be achieved as long as the plurality of block cores adopt the same structure, the categories of the block cores are decreased, the universality of the block cores are improved, and the product cost is reduced.

The third aspect according to the present disclosure further proposes a motor, including: the stator proposed in the second aspect; and a rotor, cooperating with the stator and rotating.

The motor proposed in the third aspect of the present disclosure comprises the stator proposed in the above first aspect, and thus has all the beneficial effect of the stator.

In addition, the motor further comprises the rotor, the rotor is disposed inside the stator and can cooperate with the stator to rotate, to further output a torque.

The fourth aspect according to the present disclosure further proposes a compressor, including the motor proposed in the third aspect.

The compressor proposed by the fourth aspect of the present disclosure comprises the motor proposed in the above third aspect, and thus has all the beneficial effect of the motor.

The fifth aspect according to the present disclosure further proposes a vehicle, including the compressor proposed in the fourth aspect.

The vehicle proposed by the fifth aspect of the present disclosure comprises the compressor proposed in the above fourth aspect, and thus has all the beneficial effect of the compressor.

As shown in FIG. 1 to FIG. 11, the embodiment according to the present disclosure proposes an insulating framework used for a stator, the stator comprises a winding 5, and the winding 5 is wound on the insulating framework.

And the main body of the insulating framework is approximately arranged in a U shape, the insulating framework comprises the first support 1, the second support 2, and the third support 3. The second support 2, the first support 1 and the third support 3 have the same datum plane, and for the height along one side of the datum plane, the second support 2 is greater than the first support 1, the first support 1 is greater than the third support 3, and thus a winding accommodating portion is jointly formed.

The surface of the first support 1 close to the side of the winding accommodating portion is approximately a plane, and the surface at the other side is in an arc shape.

Figure 8:
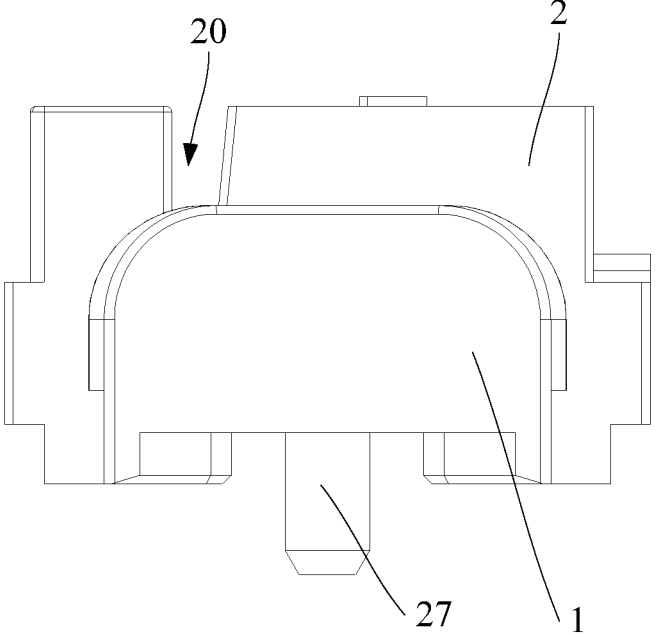
FIG. 8 shows a schematic view of the structure of the insulating framework according to an embodiment of the present disclosure.

As shown in FIG. 8 and FIG. 9, the second support 2 extends towards two sides mainly along a direction substantially perpendicular to the datum plane, a connecting protrusion 27 is provided on the second support 2, and is used for cooperating with the stator core 4 and fixing the insulating framework to the stator core 4. Viewing from the direction perpendicular to the datum plane, the protruding portion 26, the wire slot 20 and the terminal accommodating portion 24 are distributed in sequence.

The third support 3 extends from the datum plane towards the side of the winding accommodating portion; an auxiliary groove 30 is arranged in the surface close to the side of the winding accommodating portion and is configured to assist the arrangement of the winding during winding the coil, and the auxiliary groove 30 unfolds in the form of an array in the direction of the datum plane.

The protruding portion 26 comprises protrusions extending along the direction of the datum plane, the protrusions are inclined in the direction perpendicular to the datum plane, and the shape edge of the protruding portion 26 at the outermost side is shorter than the shape edge of the terminal accommodating portion 24 at the outermost side.

The wire slot 20 is divided into an upper half portion and a lower half portion; the upper half portion is a hollow portion, the lower half portion has the feature of a sloping shape, and the upper half portion and the lower half portion are divided by a step surface in the middle. The upper edge of the slope starts from the step surface and extends to the lower edge. The lower edge is in a way of being approximately flush with the surface of the auxiliary groove 30 of the third support 3.

The two sides of the terminal accommodating portion 24 are provided with the notches 2400 for accommodating conducting wires, the upper half portion of the notches 2400 is a slope-shaped opening, and the lower half portion is an approximately U shape; the accommodating groove 240 which is generally hollow and presents a rectangular area is provided in the middle portion of the terminal accommodating portion 24, and is used for accommodating a crimp terminal. A glue overflow groove 242 is provided at the two sides of the notches 2400, and the glue overflow groove 242 is a pit formed by local protruding or half protruding or has a shape similar to the pit.

Furthermore, the step surface of the wire slot 20 is lower than the lower surface of the protruding portion 26 at the outer side.

Furthermore, the width of the wire slot 20 is greater than the width of the notches 2400 of the terminal accommodating portion 24 at the outer side.

Furthermore, the side of the wire slot 20 close to the terminal accommodating portion 24 is approximately flush with the side of the third support 3 close to the protruding portion 26.

Furthermore, a marker 29 is provided in the direction of the terminal accommodating portion 24 parallel to the datum plane, and the marker 29 can be a number, a letter or a symbol with the same function. The marker 29 is in a way that when the wire diameter of the winding varies, the width of the notch 2400 of the terminal accommodating portion 24 and the width of the auxiliary groove 30 varies synchronously.

Furthermore, a step portion 28 is provided at the side of the protruding portion 26 away from the wire slot 20, and the width of the step portion 28 is less than that of the wire slot 20.

Furthermore, the sum of the widths of the plurality of auxiliary grooves 30 is less than or equal to the width of the main body of the third support 3. The auxiliary grooves 30 are cut flatly by the side surface of the third support 3 directly when extending naturally along the outer surface of the third support 3, and the highest point where they intersect during extending is named the side surface height of the auxiliary grooves 30.

Furthermore, flat and non-through cut 10 is provided in the first support 1.

Furthermore, the height of the cut 10 is consistent with the side surface height of the auxiliary grooves 30.

Furthermore, the number of the wire slot 20 is only one. Compared with the prior art, the present disclosure only needs one wire slot 20, and furthermore, the wire slot 20 accommodates the wire head and the wire tail at the same time, so that the winding of the coil is more compact.

Furthermore, the material of the insulating framework is an insulating material with a temperature resistance more than 120° C. In an embodiment, the material of the insulating framework is an insulating material with a long-term temperature resistance more than 120° C.

Furthermore, the insulating framework is configured to the stator, the stator is used in the motor, and the compressor comprises the motor.

In an embodiment, the vehicle comprises a vehicle body and the compressor, and the compressor is provided in the vehicle body.

As shown in FIG. 1 and FIG. 2, according to an embodiment of the sixth aspect of the present disclosure, the present disclosure proposes an insulating framework, including: a first support 1, a second support 2 and a third support 3.

In an embodiment, the second support 2 and the first support 1 are disposed opposite to each other; a terminal accommodating portion 24 is provided at the side of the second support 2 away from the first support 1, and the terminal accommodating portion 24 further comprises the accommodating groove 240 and the glue overflow groove 242. And the accommodating groove 240 is used for accommodating a crimp terminal, and along the first direction, a notch 2400 is provided in the side wall disposed opposite to the accommodating groove 240; along the first direction, the glue overflow groove 242 is at least provided at one side of the accommodating groove 240 and is in communication with the notch 2400; and the third support 3 is located between the first support 1 and the second support 2 and connected to the first support 1 and the second support 2.

The insulating framework proposed by the present disclosure comprises the first support 1, the second support 2 and the third support 3, the second support 2 and the first support 1 are distributed opposite to each other, the third support 3 is provided between the first support 1 and the second support 2; moreover, one end of the third support 3 is connected with the first support 1, and the other end of the third support 3 is connected with the second support 2, so that the first support 1, the second support 2 and the third support 3 are connected integrally. And the insulating framework further comprises the terminal accommodating portion 24, the terminal accommodating portion 24 is provided on the second support 2, the crimp terminal is provided inside the terminal accommodating portion 24, in-phase coils are connected inside the terminal accommodating portion 24 through the crimp terminal, so that the in-phase coils are in series connection. And the terminal accommodating portion 24 is provided at the side of the second support 2 away from the first support 1, and thus this avoids occupying the winding space of the coils. Meanwhile, the terminal accommodating portion 24 and the wire slot 20 are distributed along the first direction, and this facilitates the winding of the coils and the series connection of the in-phase coils. In addition, through disposing the terminal accommodating groove 240 in the insulating framework, other in-phase structures in electrical connection are prevented from being stacked on the insulating framework, and the integral dimension of the stator is further reduced.

And the first direction is the circumferential direction of the stator core 4.

Furthermore, as shown in FIG. 1 and FIG. 3, the terminal accommodating portion 24 further comprises the accommodating groove 240 and the glue overflow groove 242, the accommodating groove 240 is used for accommodating the crimp terminal of the stator, and the notch 2400 is provided in the accommodating groove 240, the wire head and the wire tail of in-phase coils extend into the accommodating groove 240 through the notch 2400 at one side of the accommodating groove 240, which plays the role of positioning the coils and ensures the stability of the coils, and meanwhile, the electrical connection of the in-phase coils is achieved through the crimp terminal.

In addition, the glue overflow groove 242 is at least provided at one side of the two sides of the accommodating groove 240 and is in communication with the notch 2400, and thus, after the in-phase coils are electrically connected through a connecting terminal, the coils are sealed through a sealant at the accommodating groove 240 and the notch 2400, and this improves the safety performance of the coils, and moreover, due to the arrangement of the glue overflow groove 240, in the process of using the sealant to seal the crimp terminal, redundant sealant will be blocked by the glue overflow groove 242, so that the sealant will not overflow to the outer side of the terminal accommodating portion 24, to achieve relatively good sealing for the coils.

For example, two notches 2400 are provided in the accommodating groove 240, the two notches 2400 are respectively provided in the two side walls of the accommodating groove 240 in the first direction. Likewise, the number of the glue overflow grooves 242 is two, and the two glue overflow grooves 242 are respectively provided corresponding to the two notches 2400, so that the overflow of the sealant at the two notches 2400 can be prevented through the glue overflow grooves 242 when sealing is conducted at the two notches 2400.

It can be understood that when the crimp terminal and the cut section of a conducting wire are sealed, if a sealant with a low viscosity is used, the sealant can easily flow away along the side wall of the accommodating groove 240, and thus it is difficult to achieve complete sealing to the crimp terminal and the cut section of the conducting wire. If a sealant with a high viscosity is used, as the flowability of the sealant is not high and the notches 2400 of the accommodating groove 240 are relatively narrow, it is difficult to cover them completely. Therefore, through disposing the glue overflow grooves 242 according to the present disclosure, the overflow of the sealant is prevented, and the complete sealing to the crimp terminal and the cut section of the conducting wire of the coil is achieved. In addition, when the wire tail of the coil is sealed, a good sealing for the wire tail can be achieved.

As shown in FIG. 2 and FIG. 3, the terminal accommodating portion 24 further comprises: a glue overflow table 244, and the glue overflow table 244 is provided at the two sides of the accommodating groove 240 along the first direction; and a lug boss 246, provided on the glue overflow table 244, and the glue overflow groove 242 is enclosed at least by the lug boss 246 and the glue overflow table 244.

In the embodiment, the terminal accommodating portion 24 further comprises the glue overflow table 244 and the lug boss 246, the glue overflow table 244 is provided at the two sides of the accommodating groove 240, i.e., a protruding glue overflow table 244 is provided at the two sides of the accommodating groove 240 in the first direction, and the lug boss 246 is provided on the glue overflow table 244, so that the glue overflow groove 242 is enclosed at least by the glue overflow table 244 and the lug boss 246, and thus at least a portion of the notches 2400 are surrounded by the glue overflow groove 242, and furthermore redundant sealant can flow into the glue overflow groove 242 when the sealant is poured into the accommodating groove 240 and the notches 2400 for sealing, and then the sealant is prevented from overflowing the terminal accommodating portion 24.

It can be understood that the crimp terminal pierces the coils so that the in-phase coils are connected.

For example, the crimp terminal is a piercing terminal, and thus the crimp terminal can pierce the insulating coating on the surface of the coils in the process of compressing the coils within the accommodating groove 240, to achieve the electrical connection of the in-phase coils and thus achieving rapid connection.

As shown in FIG. 1 and FIG. 3, the lug boss 246 comprises: a first bump 2460, and along a first direction, the first bump 2460 is provided at the first side of the accommodating groove 240 and is located at the side of the notch 2400 away from the first support 1; and a second bump 2462, and along the first direction, the second bump 2462 is provided at the second side of the accommodating groove 240, the glue overflow groove 242 is enclosed by the second bump 2462, the second support 2, the accommodating groove 240 and the glue overflow table 244, and a gap is provided between the second bump 2462 and the accommodating groove 240.

In the embodiment, the lug boss 246 comprises the first bump 2460 and the second bump 2462, and the first bump 2460 and the second bump 2462 are respectively provided on the glue overflow tables 244 on the two sides of the accommodating groove 240, and the first bump 2460 is located at the side of the accommodating groove 240 away from a terminal accommodating portion 24, and located at the side of the notch 2400 away from the first support 1, and thus, the redundant sealant can be blocked by the first bump 2460 when the sealant is poured into the accommodating groove 240 and the notches 2400, to avoid the overflow of the sealant. The second bump 2462 is provided at the side of the accommodating groove 240 close to the terminal accommodating portion 24, and the glue overflow groove 242 is enclosed by the second bump 2462, the surface of the second support 2 and the outer side wall surface of the accommodating groove 240, the surface of the second bump 2462 and the wall surface of the accommodating groove 240 are not completely closed therebetween and have a gap, and this helps the cutting and sealing of the wire tail of the coil.

For example, a wire slot 20 is provided in the bottom of the first bump 2460, the wire slot 20 is disposed opposite to the notches 2400, so that the coil can be further fixed in the wire slot 20, to improve the fixing performance of the coil.

In addition, the dimension of the gap is relatively small, which prevents the sealant from flowing out. In an embodiment, the width of the gap is greater than or equal to 1 mm, and is less than or equal to 5 mm.

As shown in FIG. 1, the notch 2400 comprises a first channel 2402 and a second channel 2404 which are in communication, the first channel 2402 is located on the top of the second channel 2404, and the side wall of the first channel 2402 is provided gradually expanding towards the two sides of the first channel 2402.

In the embodiment, the notch 2400 comprises the first channel 2402 and the second channel 2404 which are in communication, i.e., the notch 2400 is divided into an upper half portion and a lower half portion, and the first channel 2402 is located at the upper half portion, the second channel 2404 is located at the lower half portion, and the upper half portion is in communication with the lower half portion, and the side wall of the first channel 2402 is arranged expanding gradually to help pass the wire at the notch 2400; meanwhile, the inclining arrangement of the upper half portion of the notch 2400 can further help the pouring of the sealant, so that the sealant can flow towards the bottom of the notch 2400 along the wall surface arranged inclinedly, to improve the sealing effect of the sealant to the cut section of the coil.

For example, the notch 2400 approximately presents a U shape, the side wall of the first channel 2402 presents a sloping shape, the side wall of the second channel is approximately straight.

As shown in FIG. 4, FIG. 5 and FIG. 6, the insulating framework further comprises a protruding portion 26, provided at the side of the second support 2 away from the first support 1, and along the first direction, the protruding portion 26 and the terminal accommodating groove 240 are arranged in sequence.

In the embodiment, the insulating framework further comprises the protruding portion 26, the protruding portion 26 is provided on the second support 2 and located at the side of the second support 2 away from the first support 1 and the third support 3; the protruding portion 26 and the terminal accommodating portion 24 are arranged sequentially along the first direction, and the arrangement of the protruding portion 26 can play the role of limiting the coil, and preventing the coil from escaping; and in an embodiment, the arrangement of the protruding portion 26 can prevent the escaping of the wire tail of the coil and improve the fixing performance of the coil.

For example, the stator comprises a stator core 4, the insulating framework and an insulating cover plate 6; the insulating framework is provided at the two ends of the stator core 4, and the insulating cover plate 6 is provided at the two ends of the insulating framework away from the stator core 4. The insulating cover plate 6 plays the role of insulating, and improves the safety performance of the motor. And the protruding portion 26 is in buckling connection with the insulating cover plate 6, so that the insulating framework is connected with the insulating cover plate 6, to improve the reliability of the connection between the insulating cover plate 6 and the insulating framework.

It can be understood that both the insulating cover plate 6 and the insulating framework are made by insulating materials.

In an embodiment, the second support 2 is provided with the wire slot 20, and the protruding portion 26, the wire slot 20 and the terminal accommodating portion 24 are arranged sequentially along the first direction. The wire slot 20 comprises a bottom wall, the bottom wall of the wire slot 20 inclines towards the bottom of the second support 2 to form an inclined portion 22 arranged inclinedly, and the inclined portion 22 is located at a side close to the first support 1, and thus, when a wire is wound by the insulating framework, the coil extends into the wire slot 20 from the side of the wire slot 20 away from the first support 1 and thus extends along the inclined portion 22 to the bottom of the first support 1, so that winding of the coil is facilitated; moreover, the wire slot 20 can pre-fix the coil, so that the winding of the coil is more compact, and the fixing performance of the coil is improved, and the slot fill factor of the stator core 4 is improved.

For example, the insulating framework is used in the stator, the stator comprises the stator core 4, a coil and the above insulating framework; and the insulating framework is provided at the two ends of the stator core 4 in the axial direction, and the coil is wound around the insulating framework and the stator core 4. A winding accommodating portion is enclosed by the first support 1, the second support 2 and the third support 3 for accommodating the coil, the stator core 4 inlets wire through the wire slot 20, so that the coil inclines downwards along the inclined portion 22 and the winding of the coil is more compact.

It can be understood that the wire slot 20 comprises an opening and a bottom wall disposed opposite to the opening, a portion of the bottom wall of the wire slot 20 inclines towards the bottom direction of the second support 2 to form the inclined portion 22; moreover, the inclined portion 22 is provided at the side of the wire slot 20 facing the first support 1, i.e., the inclined portion 22 is provided at the inner side of the first support 1. That is, the upper half portion of the wire slot 20 approximately presents a U shape, the opening is located in the U-shaped top, the lower half portion of the wire slot 20 presents a sloping shape, so that the coil is more compact when the wire crosses, and the fixing performance of the winding of the coil is improved.

In an embodiment, when the insulating framework is used in the stator, the first support 1 is close to the inner side of the stator core 4, the second support 2 is close to the outer side of the stator core 4, and the third support 3 is connected with and located between the first support 1 and the second support 2.

For block cores, each block core is wound with a coil, each coil comprises a wire head and a wire tail, and after accomplishing the winding, the wire tail extends into the wire slot 20 through the bottom of the protruding portion 26, and the coil is limited through the wire slot 20.

It can be understood that along the first direction, the wire slot 20 comprises a first side and a second side; the first side of the wire slot 20 and the second side of the wire slot 20 are two sides of the wire slot 20 disposed opposite to each other, and the side of the wire slot 20 close to the terminal accommodating portion 24 is the first side of the wire slot 20, and the side of the wire slot 20 close to the protruding portion 26 is the second side of the wire slot 20.

Furthermore, the width of the wire slot 20 is greater than that of the notch 2400.

In the embodiment, both the wire head and the wire tail of the coil are provided in the notch 2400, which helps the coil enter into the groove, the width of the wire slot 20 is greater than that of the notch 2400, so that the wire head and the wire tail are in more compact connection with the notch 2400 when entering into the notch 2400, to improve the fixing performance of the notch 2400 to the coil.

For example, the width of the wire slot 20 is further the width of the wire slot 20 along the first direction, and the width of the notch 2400 is further the width of the notch 2400 along a second direction. In an embodiment, both the wire slot 20 and the notch 2400 approximately presents a U shape, and the width of the wire slot 20 and the width of the notch 2400 are further the distance between the U-shaped side walls at the left and right sides.

Through the above arrangement of the widths of the notch 2400 and the wire slot 20, on the one hand, the notch 2400 can accommodate both the wire head and the wire tail of the coil at the same time, and on the other hand can improve the tightness of the coil.

As shown in FIG. 4 to FIG. 7, at least a portion of the top wall of the protruding portion 26 inclines towards the bottom of the second support 2.

In the embodiment, at least a portion of the top wall of the protruding portion 26 inclines towards the bottom of the second support 2, on the one hand, it decreases the materials used by the protruding portion 26 and reduces the production cost, and on the other hand, it prevents the interference to other structures when the insulating framework is used in cooperation with other structures.

For example, the cross section of the protruding portion 26 approximately presents a triangular shape.

According to an embodiment of the present disclosure, the length of the terminal accommodating portion 24 protruding out of the second support 2 is greater than the length of the protruding portion 26 protruding out of the second support 2.

In the embodiment, both the terminal accommodating portion 24 and the protruding portion protrude out of the second support 2 towards the side away from the first support 1, and the length of the protruding portion protruding out of the second support 2 is less than the length of the terminal accommodating portion 24 protruding out of the second support 2, and thus, when the insulating framework is connected with the insulating cover plate 6, this avoids interference to the connection between the insulating framework and the insulating cover plate 6, and ensures the reliability of their connection.

It can be understood that the second support 2, the third support 3 and the first support 1 are sequentially distributed along the second direction, and the length of the protruding portion along the second direction is less than the length of the terminal accommodating portion 24.

It can be understood that the second direction is the radial direction of the stator core 4.

According to an embodiment of the present disclosure, the surface of the protruding portion 26 close to the bottom of the second support 2 is located at the side of the bottom wall of the wire slot 20 away from the bottom of the second support 2.

In the embodiment, the surface of the protruding portion 26 close to the bottom of the second support 2 is located at the side of the bottom wall of the wire slot 20 away from the bottom of the second support 2; through the above arrangement, the surface of the protruding portion 26 close to the bottom of the second support 2 is higher than the bottom wall of the wire slot 20, that is, the bottom wall of the wire slot 20 is lower than the lower surface of the protruding portion 26, and furthermore, the wire tail of the coil is wound from the side of the protruding portion 26 away from the wire slot 20 towards the wire slot 20, which can prevent the coil from bending at the wire slot 20 and further make the wiring of the coil more compact.

In an embodiment, the distance between the lower surface of the protruding portion 26 and the bottom wall of the wire slot 20 is larger than or equal to the diameter of the conducting wire in the coil. It can be understood that the coil is formed by winding a conducting wire around the block core and the insulating framework.

As shown in FIG. 5 and FIG. 9, the insulating framework further comprises a step portion 28 provided on the second support 2, and the step portion 28 is located at the side of the protruding portion 26 away from the terminal accommodating portion 24.

In the embodiment, the insulating framework further comprises the step portion 28, the step portion 28 is provided on the second support 2 for bearing the coil, and in an embodiment, the step portion 28 is configured to bear the wire tail of the coil. The tightness of the winding of the coil is improved.

In an embodiment, the step portion 28 is provided at the side of the protruding portion 26 away from the wire slot 20, and thus, the wire tail of the coil is wound from the upper surface of the step portion 28 to below the protruding portion 26, and further extends into the wire slot 20, and the wire tail of the coil is fixed through the wire slot 20.

As shown in FIG. 1 to FIG. 7, the third support 3 is provided with a plurality of auxiliary grooves 30, any of the auxiliary grooves 30 extends along the first direction, the plurality of auxiliary grooves 30 are distributed along the direction from the first support 1 to the second support 2, and the first support 1, the third support 3 and the second support 2 are sequentially distributed along the second direction.

In the embodiment, the third support 3 is provided with the auxiliary grooves 30, the number of the auxiliary grooves 30 is multiple, the coil is fixed through the auxiliary grooves 30, to improve the tightness and stability of the winding of the coil. And each auxiliary groove 30 extends along the first direction, the plurality of auxiliary grooves 30 are distributed in array along the second direction, and the coil is wound around the insulating framework by the auxiliary grooves 30.

In an embodiment, the auxiliary grooves 30 are provided in the upper surface of the third support 3, and the auxiliary grooves 30 are cut flatly by the side surface of the third support 3 directly when extending naturally along the outer surface of the third support 3.

In an embodiment, the second direction is the radial direction of the stator core 4.

As shown in FIG. 4, the edge of the inclined portion 22 close to the bottom of the second support 2 is approximately flush with the bottom of the auxiliary grooves 30.

In the embodiment, the edge of the inclined portion 22 close to the bottom of the second support 2 is approximately aligned with the bottom of the auxiliary grooves 30, and this prevents the bending of the coil and ensures the tightness of the winding of the coil.

It can be understood that the edge of the inclined portion 22 which is close to the bottom of the second support 2 is the lower edge of the inclined portion 22. The lower edge of the inclined portion 22 is approximately flush with the bottom of the auxiliary grooves 30, that is, the lower edge of the inclined portion 22 is flush with the bottom of the auxiliary grooves 30, or the lower edge of the inclined portion 22 is slightly higher than the bottom of the auxiliary grooves 30.

According to an embodiment of the present disclosure, the wall surface of the wire slot 20 close to the terminal accommodating portion 24 is approximately flush with the wall surface of the third support 3 close to the wire slot 20.

In the embodiment, the wall surface of the wire slot 20 close to the terminal accommodating portion 24 is approximately flush with the wall surface of the third support 3 close to the wire slot 20, and thus, when the coil is wound from the wire slot 20 to the third support 3, the winding of the coil is more compact, to improve the slot fill factor of the stator core 4.

It can be understood that the wall surface of the wire slot 20 close to the terminal accommodating portion 24 is approximately flush with the wall surface of the third support 3 close to the wire slot 20, that is, the wall surface of the wire slot 20 close to the accommodating portion is flush with the wall surface of the third support 3 close to the wire slot 20, or there is a tiny distance between the wall surface of the wire slot 20 close to the accommodating portion and the wall surface of the third support 3 close to the wire slot 20.

As shown in FIG. 7, the side of the first support 1 facing the second support 2 is provided with a cut 10, the cut 10 is arranged close to the bottom of the first support 1, and along the first direction, the cut 10 is located at the two sides of the third support 3.

In the embodiment, the first support 1 is disposed with the cut 10, the cut 10 is located at the inner side of the first support 1, and this can evade the winding of the coil, and ensures the tightness of the winding of the coil.

In an embodiment, the cut 10 is located at the side of the first support 1 facing the second support 2, and provided close to the bottom of the first support 1; and, furthermore, along the first direction, the cut 10 is disposed at the two sides of the third support 3, and thus this can decrease the integral weight of the insulating framework, reduce the production cost, and can further prevent affecting the winding of the coil due to excessive compressing to the coil by the third support 3.

For example, the wall surface of the first support 1 facing the second support 2 is approximately a plane, the wall surface of the first support 1 away from the second support 2 is arc-shaped, and furthermore, when the insulating framework is used in the stator, the first support 1 can enclose a ring shape to adapt to the shape of the tooth portion of the stator, and this is convenient for the loading and moving of the rotor. Meanwhile, due to the arrangement of the cut 10, the shape of the first support 1 can adapt to the end of the tooth portion of the stator facing the interior of the stator, and this increases the slot fill factor of the stator and meanwhile makes the integral connection more compact.

In an embodiment, the cut 10 is a flat and non-through structure.

Furthermore, the side of the cut 10 close to the top of the first support 1 is flush with the top of the auxiliary grooves 30.

In the embodiment, the side of the cut 10 close to the top of the first support 1 is flush with one side of the top of the auxiliary grooves 30, and this ensures the effect of evading the coil by the cut 10, and increases the slot fill factor of the stator.

As shown in FIG. 1 to FIG. 7, the insulating framework further comprises a marker 29 provided on at least one of the second support 2 and the first support 1, and the marker 29 corresponds to the width of the notch 2400 and the width of the auxiliary groove 30 of the third support 3.

In the embodiment, the insulating framework further comprises the marker 29, the marker 29 is provided on at least one of the second support 2 and the first support 1, and it can be understood that winding different stators will correspond to different coil diameters, and further correspond to different widths of the auxiliary groove 30 and different widths of the notch 2400, that is, the diameter of the coil is in one-to-one correspondence with the width of the notch 2400 and the width of the auxiliary groove 30, and therefore, the diameter of the coil varies synchronously with the width of the notch 2400 and the width of the auxiliary groove 30; therefore, according to the embodiment proposed by the present disclosure, the marker 29 is provided on the insulating framework, and the marker 29 is in one-to-one correspondence with the diameter of the coil, the width of the notch 2400 and the width of the auxiliary groove 30, and this can be configured to select different insulating frameworks based on the markers 29 according to different coil diameters; in an embodiment, different insulating frameworks correspond to different dimensions of the width of the notch 2400 and the width of the auxiliary groove 30, and then the insulating frameworks of multiple dimensions and speculations can adapt to coils of different dimensions.

In an embodiment, the width of the notch 2400 and the yoke width of the auxiliary groove 30 have multiple dimensions, and can be selected and used according to actual conditions.

In an embodiment, the marker 29 can be a number, a letter or a symbol with the same function.

For example, the marker 29 is provided at the terminal accommodating portion 24 of the second support 2, and furthermore, the marker 29 is provided on the top of the terminal accommodating portion 24 for the convenience of users' identification.

As shown in FIG. 10 and FIG. 11, the seventh aspect according to the present disclosure further proposes a stator, including: a crimp terminal, provided inside an accommodating groove 240; a stator core 4, and the stator core 4 comprises a plurality of block cores connected in sequence, the block cores comprise tooth portions, and a stator groove is enclosed by the tooth portions of two adjacent block cores; and an insulating framework according to in any of the first aspect, and the number of the insulating frameworks is multiple, the two ends of any of the block cores are provided with the insulating frameworks, and a third support 3 is disposed opposite to the tooth portions; and a winding 5, and the winding 5 is wound around the tooth portions and the insulating frameworks.

The stator proposed by the seventh aspect of the present disclosure comprises the insulating framework proposed by any of the above embodiments, and thus has all the beneficial effect of the insulating framework.

Furthermore, the stator comprises the stator core 4, the stator core 4 comprises a plurality of block cores connected in sequence, the block cores comprise the tooth portions, and the stator groove is enclosed between the tooth portions of two adjacent block cores for accommodating the winding 5, and both ends of each of the block cores are provided with the insulating frameworks, so that the winding 5 can be wound around the tooth portions and the insulating frameworks, and the insulating performance is ensured. Meanwhile, by this winding method, the electrical connection of in-phase windings 5 can be achieved on the insulating framework, and it is not necessary to stack other structures for achieving the electrical connections, to further lower the axial height of the stator and making the ends of the stator more compact. And the crimp terminal achieves the connection of the in-phase winding 5 in the accommodating groove 240.

Furthermore, the winding 5 comprises a plurality of coils, one of the coils is wound around one of the block cores and the insulating frameworks at the two ends of the block core, the coil comprises a wire head and a wire tail, and the wire slot 20 is configured to accommodate the wire head and the wire tail.

In the embodiment, the winding 5 comprises a plurality of coils, one block core and the insulating frameworks at the two ends of the block core constitute a core component, and each core component is wound with one coil, and after each coil is wound, the plurality of core components are rounded to form the stator, and thus, this can prevent scratching the insulating layer on the surface of the coil while the slot fill factor is improved.

And the coil comprises a wire head and a wire tail, and the wire slot 20 is configured to accommodate the wire head and the wire tail, to ensure the tightness of the winding of the coil.

In an embodiment, the wire head is buckled in the wire slot 20 in one end of the stator core 4 in the axial direction, then extends towards the other end of the stator core 4, and starts to wind from the side of the insulating framework away from the wire slot 20, so that the wire tail is located at the side of the insulating framework close to the wire slot 20, and then, the wire tail is wound to the step portion 28, then extends to below the protruding portion 26 via the upper surface of the step portion 28, further extends into the wire slot 20, and is pre-fixed in the wire slot 20. When all the coils are wound, the plurality of block cores are rounded to form the stator; compared with the prior art, the embodiment proposed in the present disclosure can not only improve the slot fill factor of the stator, but further prevent causing damage to the insulating layer of the coil itself.

Furthermore, the stator further comprises: an insulating cover plate 6, provided at the two sides of the insulating framework, and an avoiding groove is provided in the insulating cover plate 6, and the avoiding groove is arranged corresponding to the marker 29 on the insulating framework and is used for avoiding the marker 29.

In the embodiment, the stator further comprises the insulating cover plate 6, the avoiding groove is provided in the insulating cover plate 6, for avoiding the marker 29 on the insulating framework.

Furthermore, the stator further comprises the insulating cover plate 6, and the insulating cover plate 6 is provided at the side of the insulating framework away from the stator core 4, and the insulating cover plate 6 is in buckling connection with the protruding portion 26 of the insulating framework.

In the embodiment, the insulating framework further comprises the insulating cover plate 6, the insulating cover plate 6 is provided at the side of the insulating framework away from the stator core 4, and through disposing the insulating framework, the insulating protection for the two ends of the coil can be achieved, and the safety performance of the stator is improved. And the insulating cover plate 6 is connected with the protruding portion 26 of the insulating framework, and this achieves fixing the insulating cover plate 6, so that the integral structure of the stator is more compact and the effective locking of the two is achieved.

Furthermore, the insulating cover plate 6 is in buckling connection with the protruding portion 26 of the insulating framework.

As shown in FIG. 12, in the specific disclosure, the insulating cover plate 6 is provided with a buckle 60, the buckle 60 is in buckling connection with the protruding portion 26. It can be understood that the length of the protruding portion 26 is less than the length of the terminal accommodating portion 24, and therefore, the buckling connection between the buckle 60 and the protruding portion 26 is ensured.

Furthermore, any of the block cores comprises a plurality of punching sheets, and the plurality of punching sheets are laminated along the axial direction of the stator core 4.

In the embodiment, it is arranged that each block core comprises a plurality of punching sheets, and the plurality of punching sheets are laminated along the axial direction of the stator core 4, and thus, an overlapping portion is formed at the circumferential edge of the punching sheets; when the plurality of punching sheets are laminated along the axial direction of the core, an overlapping gap is defined between adjacent punching sheets and formed in the stator groove, and it is convenient to wind the winding 5 around the tooth portion of the stator core 4 and locate the winding inside the stator groove.

In an embodiment, the punching sheet is a silicon steel sheet.

Furthermore, two adjacent block cores are rotatably connected through the overlapping portion.

In the embodiment, two adjacent block cores are rotatably connected through the overlapping portion, i.e., the two block cores after connection can rotate relative to each other.

Through rotatably connect the two adjacent block cores through the overlapping portion, one block core can be made to rotate around the other block core with the connecting point of the overlapping portion as the center of a circle, and this connecting method is simple and reliable, and helps operators conduct adjustments to the shape and the structure of the stator core 4, and the position of the block core can be adjusted according to the needs in use.

In the above embodiment, furthermore, the stator core 4 comprises a tooth portion and a yoke portion, and the stator core 4 at least comprises a first state and a second state; in the first state, the plurality of block cores are rounded to form a first ring, and the tooth portions are located at the inner side of the yoke portion; and in the second state, the plurality of block cores unfold to approximately present a straight-line form.

In the embodiment, the stator core 4 comprises the first state, the first state is a conventional state after the winding 5 is wound around the stator core 4; in the first state, the plurality of block cores are rounded to form the first ring, and the tooth portions are located at the inner side of the yoke portion. Under this state, the winding 5 is wound in the stator groove constituted by adjacent tooth portions, and the winding 5 is close to the inner side of the stator core 4, and two adjacent stator cores 4 are rotatably connected to each other through the overlapping portion provided on the yoke portion at the outer side, and jointly enclose a circular stator core 4.

The stator core 4 further comprises the second state; since two adjacent block cores are in rotatable connection, when two adjacent block cores in the stator core 4 move relative to each other, the plurality of block cores can unfold to approximately present a straight-line form. The tooth portions of the unfolded block cores are distributed approximately in a straight-line form, since the stator core 4 is in an unfolded state, the space of the stator groove between two tooth portions increases to a certain extent compared with the first state, and this helps operators wind the winding 5.

Through putting the stator core 4 in the second state, the tooth portions can be made to approximately present a straight-line distribution, and the space of the stator groove is made to increase, to help the operators wind the winding 5. After accomplishing the operation of winding the winding 5, the stator core 4 is enclosed into the first state, so that the block cores enclose a circular stator core 4, to make the structure of the stator core 4 stable and reliable.

Furthermore, in the second state, two block cores at the two ends are connected to each other after the rounding, and in an embodiment, the two block cores can be welded after the rounding.

It can be understood that the stator core 4 approximately presents a straight-line form in the second state, including the situations that the stator core 4 presents a straight-line form, or the stator core 4 has a certain radian.

In the above embodiment, furthermore, the plurality of punching sheets comprise a first punching sheet layer and a second punching sheet layer which are arranged alternatively; the first side of the first punching sheet layer is provided with an overlapping portion, the overlapping portion on the first punching sheet layer protrudes out of the second punching sheet layer, and an overlapping gap is enclosed by two adjacent first punching sheet layers; the second side of the second punching sheet layer is provided with an overlapping portion, the overlapping portion on the second punching sheet layer protrudes out of the first punching sheet layer, and an overlapping gap is enclosed by two adjacent second punching sheet layers; for two adjacent block cores, the overlapping portion of one block core is inserted into the overlapping gap of the other block core.

In the embodiment, the plurality of punching sheets comprise the first punching sheet layer and the second punching sheet layer, and a plurality of the first punching sheet layers and a plurality of the second punching sheet layers are distributed alternatively along the axial direction of the stator core 4. The first punching sheet layer is provided with an overlapping portion at the first side, and the overlapping portion on the first punching sheet layer protrudes out of the second punching sheet layer; since the plurality of the first punching sheet layers and the plurality of the second punching sheet layers are arranged alternatively, both of two adjacent first punching sheet layers protrude out of the second punching sheet layer provided in the middle of the two adjacent first punching sheet layers, so that an overlapping gap is enclosed between the two adjacent first punching sheet layers. The second punching sheet layer is provided with an overlapping portion at the second side, that is, the second punching sheet layer is provided with the overlapping portion at the side different from the first punching sheet layer. The overlapping portion on the second punching sheet layer protrudes out of the first punching sheet layer; since the plurality of the first punching sheet layers and the plurality of the second punching sheet layers are arranged alternatively, both of two adjacent second punching sheet layers protrude out of the first punching sheet layer arranged in the middle of the two adjacent second punching sheet layers, so that the overlapping gap can further be enclosed between the two adjacent second punching sheet layers.

It can be understood that the overlapping portions of the plurality of the first punching sheet layers disposed at the first side and the overlapping portions of the plurality of the second punching sheet layers disposed at the second side are in an interlacing arrangement when the plurality of the first punching sheet layers and the plurality of the second punching sheet layers are distributed alternatively along the circumferential direction of the stator core 4. Furthermore, the overlapping gap located between two adjacent first punching sheet layers and the overlapping gap located between two adjacent second punching sheet layers are respectively located at the two sides of the block core and are in an interlacing arrangement.

An overlapping portion and an overlapping gap are respectively provided at the sides of two adjacent block cores close to each other, since the overlapping portions of the plurality of the first punching sheet layers disposed at the first side and the overlapping portions of the plurality of the second punching sheet layers disposed at the second side are in interlacing arrangement, and the overlapping gap located between two adjacent first punching sheet layers and the overlapping gap located between two adjacent second punching sheet layers are in interlacing arrangement, the overlapping portion of one block core is inserted into the overlapping gap of another block core, to achieve the connection of two adjacent block cores.

Through alternatively arranging the first punching sheet layers and the second punching sheet layers, arranging the overlapping portions respectively at different sides of the first punching sheet layers and the second punching sheet layers, and enclosing the overlapping gaps at different sides through the first punching sheet layers and the second punching sheet layers, two adjacent block cores can be connected through the overlapping portion and the overlapping gap, and in an embodiment, the overlapping portion of one block core is inserted into the overlapping gap of the other block core. This connecting method is stable and reliable, and an operator can disassemble and assemble the stator core 4 rapidly, and then the work efficiency is improved. The mutual connection can be achieved as long as the plurality of block cores adopt the same structure, the categories of the block cores are decreased, the universality of the block cores are improved, and the product cost is reduced.

In the above embodiment, furthermore, the plurality of punching sheets comprise a first punching sheet layer and a second punching sheet layer which are arranged alternatively; the first side of the first punching sheet layer is provided with an overlapping portion, the overlapping portion on the first punching sheet layer protrudes out of the second punching sheet layer, and an overlapping gap is enclosed by two adjacent first punching sheet layers; the second side of the second punching sheet layer is provided with an overlapping portion, the overlapping portion on the second punching sheet layer protrudes out of the first punching sheet layer, and an overlapping gap is enclosed by two adjacent second punching sheet layers; for two adjacent block cores, the overlapping portion of one block core is inserted into the overlapping gap of the other block core.

In the embodiment, the plurality of punching sheets comprise the first punching sheet layer and the second punching sheet layer, and a plurality of the first punching sheet layers and a plurality of the second punching sheet layers are distributed alternatively along the axial direction of the stator core 4. The first punching sheet layer is provided with an overlapping portion at the first side, and the overlapping portion on the first punching sheet layer protrudes out of the second punching sheet layer; since the plurality of the first punching sheet layers and the plurality of the second punching sheet layers are arranged alternatively, both of two adjacent first punching sheet layers protrude out of the second punching sheet layer provided in the middle of the two adjacent first punching sheet layers, so that an overlapping gap is enclosed between the two adjacent first punching sheet layers. The second punching sheet layer is provided with an overlapping portion at the second side, that is, the second punching sheet layer is provided with the overlapping portion at the side different from the first punching sheet layer. The overlapping portion on the second punching sheet layer protrudes out of the first punching sheet layer; since the plurality of the first punching sheet layers and the plurality of the second punching sheet layers are arranged alternatively, both of two adjacent second punching sheet layers protrude out of the first punching sheet layer arranged in the middle of the two adjacent second punching sheet layers, so that the overlapping gap can further be enclosed between the two adjacent second punching sheet layers.

It can be understood that the overlapping portions of the plurality of the first punching sheet layers disposed at the first side and the overlapping portions of the plurality of the second punching sheet layers disposed at the second side are in an interlacing arrangement when the plurality of the first punching sheet layers and the plurality of the second punching sheet layers are distributed alternatively along the circumferential direction of the stator core 4. Furthermore, the overlapping gap located between two adjacent first punching sheet layers and the overlapping gap located between two adjacent second punching sheet layers are respectively located at the two sides of the block core and are in an interlacing arrangement.

An overlapping portion and an overlapping gap are respectively provided at the sides of two adjacent block cores close to each other, since the overlapping portions of the plurality of the first punching sheet layers disposed at the first side and the overlapping portions of the plurality of the second punching sheet layers disposed at the second side are in interlacing arrangement, and the overlapping gap located between two adjacent first punching sheet layers and the overlapping gap located between two adjacent second punching sheet layers are in interlacing arrangement, the overlapping portion of one block core is inserted into the overlapping gap of another block core, to achieve the connection of two adjacent block cores.

Through alternatively arranging the first punching sheet layers and the second punching sheet layers, arranging the overlapping portions respectively at different sides of the first punching sheet layers and the second punching sheet layers, and enclosing the overlapping gaps at different sides through the first punching sheet layers and the second punching sheet layers, two adjacent block cores can be connected through the overlapping portion and the overlapping gap, and in an embodiment, the overlapping portion of one block core is inserted into the overlapping gap of the other block core. This connecting method is stable and reliable, and an operator can disassemble and assemble the stator core 4 rapidly, and then the work efficiency is improved. The mutual connection can be achieved as long as the plurality of block cores adopt the same structure, the categories of the block cores are decreased, the universality of the block cores are improved, and the product cost is reduced.

As shown in FIG. 8, a connecting protrusion 27 is provided on the bottom of the second support 2, a groove is provided in the stator core 4, and the connecting protrusion 27 is connected with the groove.

In the embodiment, the connecting protrusion 27 is provided on the second support 2, and is used for cooperating with the stator core 4 and fixing the insulating framework to the stator core 4.

The eighth aspect of the present disclosure further proposes a motor, including: the stator proposed in the seventh aspect; and a rotor, cooperating with the stator and rotating.

The motor proposed in the eighth aspect of the present disclosure comprises the stator proposed in the above seventh aspect, and thus has all the beneficial effect of the stator.

In addition, the motor further comprises the rotor, the rotor is disposed inside the stator and can cooperate with the stator to rotate, to further output a torque.

The ninth aspect according to the present disclosure further proposes a compressor, including the motor proposed in the eighth aspect.

The compressor proposed by the ninth aspect of the present disclosure comprises the motor proposed in the above eighth aspect, and thus has all the beneficial effect of the motor.

The tenth aspect according to the present disclosure further proposes a vehicle, including the compressor proposed in the ninth aspect.

The vehicle proposed by the tenth aspect of the present disclosure comprises the compressor proposed in the above ninth aspect, and thus has all the beneficial effect of the compressor.

As shown in FIG. 1 to FIG. 11, the embodiment according to the present disclosure proposes an insulating framework used for a stator, the stator comprises a winding 5, and the winding 5 is wound on the insulating framework.

And the main body of the insulating framework is approximately arranged in a U shape, the insulating framework comprises the first support 1, the second support 2, and the third support 3. The second support 2, the first support 1 and the third support 3 have the same datum plane, and for the height along one side of the datum plane, the second support 2 is greater than the first support 1, the first support 1 is greater than the third support 3, and thus a winding accommodating portion is jointly formed.

The surface of the first support 1 close to the side of the winding accommodating portion is approximately a plane, and the surface at the other side is in an arc shape.

The second support 2 extends towards two sides mainly along a direction substantially perpendicular to the datum plane, a connecting protrusion 27 is provided on the second support 2, and is used for cooperating with the stator core 4 and fixing the insulating framework to the stator core 4. Viewing from the direction perpendicular to the datum plane, the protruding portion 26, the wire slot 20 and the terminal accommodating portion 24 are distributed in sequence.

The third support 3 extends from the datum plane towards the side of the winding accommodating portion; an auxiliary groove 30 is arranged in the surface close to the side of the winding accommodating portion and is configured to assist the arrangement of the winding during winding the coil, and the auxiliary groove 30 unfolds in the form of an array in the direction of the datum plane.

The protruding portion 26 comprises protrusions extending along the direction of the datum plane, the protrusions are inclined in the direction perpendicular to the datum plane, and the shape edge of the protruding portion 26 at the outermost side is shorter than the shape edge of the terminal accommodating portion 24 at the outermost side.

The wire slot 20 is divided into an upper half portion and a lower half portion; the upper half portion is a hollow portion, the lower half portion has the feature of a sloping shape, and the upper half portion and the lower half portion are divided by a step surface in the middle. The upper edge of the slope starts from the step surface and extends to the lower edge. The lower edge is in a way of being approximately flush with the surface of the auxiliary groove 30 of the third support 3.

The two sides of the terminal accommodating portion 24 are provided with the notches 2400 for accommodating conducting wires, the upper half portion of the notches 2400 is a slope-shaped opening, and the lower half portion is an approximately U shape; the accommodating groove 240 which is generally hollow and presents a rectangular area is provided in the middle portion of the terminal accommodating portion 24, and is used for accommodating a crimp terminal. A glue overflow groove 242 is provided at the two sides of the notch 2400, and the glue overflow groove 242 is a pit formed by local protruding or half protruding or has a shape similar to the pit.

Furthermore, the step surface of the wire slot 20 is lower than the lower surface of the protruding portion 26 at the outer side.

Furthermore, the width of the wire slot 20 is greater than the width of the notches 2400 of the terminal accommodating portion 24 at the outer side.

Furthermore, the side of the wire slot 20 close to the terminal accommodating portion 24 is approximately flush with the side of the third support 3 close to the protruding portion 26.

Furthermore, a marker 29 is provided in the direction of the terminal accommodating portion 24 parallel to the datum plane, and the marker 29 can be a number, a letter or a symbol with the same function. The marker 29 is in a way that when the wire diameter of the winding varies, the width of the notch 2400 of the terminal accommodating portion 24 and the width of the auxiliary groove 30 varies synchronously.

Furthermore, a step portion 28 is provided at the side of the protruding portion 26 away from the wire slot 20, and the width of the step portion 28 is less than that of the wire slot 20.

Furthermore, the sum of the widths of the plurality of auxiliary grooves 30 is less than or equal to the width of the main body of the third support 3. The auxiliary grooves 30 are cut flatly by the side surface of the third support 3 directly when extending naturally along the outer surface of the third support 3, and the highest point where they intersect during extending is named the side surface height of the auxiliary grooves 30.

Furthermore, a flat and non-through cut 10 is provided in the first support 1.

Furthermore, the height of the cut 10 is consistent with the side surface height of the auxiliary grooves 30.

Furthermore, the number of the wire slot 20 is only one. Compared with the prior art, the present disclosure only needs one wire slot 20, and furthermore, the wire slot 20 accommodates the wire head and the wire tail at the same time, so that the winding of the coil is more compact.

Furthermore, the material of the insulating framework is an insulating material with a temperature resistance more than 120° C. In an embodiment, the material of the insulating framework is an insulating material with a long-term temperature resistance more than 120° C.

Furthermore, the insulating framework is configured to the stator, the stator is used in the motor, and the compressor comprises the motor.

In an embodiment, the vehicle comprises a vehicle body and the compressor, and the compressor is provided in the vehicle body.

In the present disclosure, the term of "multiple" indicates two or more, unless otherwise explicitly specified or defined.

The terms of "provided", "connected with", "connection", "fixing" and the like should be understood in a broad sense, for example, the term "connection" may be a fixed connection, and may further be a removable connection, or an integral connection; and the term of "connected with" may be a direct connection and may further be an indirect connection through an intermediate medium. A person of ordinary skills in the art could understand the specific meanings of the terms in the present disclosure according to specific situations.

In the description of the present specification, the descriptions of the terms "one embodiment", "some embodiments" and "specific embodiments" and the like mean that specific features, structures, materials or characteristics described in combination with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

The descriptions above are only some embodiments of the present disclosure, and are not configured to limit the present disclosure. For a person skilled in the art, the present disclosure may have various changes and variations. Any modifications, equivalent substitutions, improvements and etc. made within the spirit and principle of the present disclosure shall all be included in the protection scope of the present disclosure.

What is claimed is:

1. An insulating framework comprising:
   a first support;
   a second support, disposed opposite to the first support, the second support being provided with a wire slot, the wire slot passing through a wall surface of the second support, a portion of a bottom wall of the wire slot inclining towards the bottom of the second support to form an inclined portion, and the inclined portion being located on the side of the wire slot facing the first support;
   a third support, located between the first support and the second support and connected to the first support and the second support; and
   a terminal accommodating portion, provided at the side of the second support away from the first support, wherein the terminal accommodating portion further comprises:
   an accommodating groove for accommodating the crimp terminal, wherein a notch is provided in the accommodating groove, and the notch is located in a side wall of the accommodating groove along a first direction; and
   a glue overflow groove, wherein, along the first direction, the glue overflow groove is located at two sides of the accommodating groove, and the glue overflow groove is in communication with the notch.

2. The insulating framework according to claim 1, wherein along the first direction, the terminal accommodating portion being located at a first side of the wire slot.

3. The insulating framework according to claim 2, further comprising a protruding portion, provided at the side of the second support away from the first support, wherein, along the first direction, the protruding portion is located at a second side of the wire slot.

4. The insulating framework according to claim 3, wherein:

at least a portion of the top wall of the protruding portion inclines towards the bottom of the second support; and/or the surface of the protruding portion close to the bottom of the second support is located at the side of the bottom wall of the wire slot away from the bottom of the second support; and/or the length of the terminal accommodating portion protruding out of the second support is greater than the length of the protruding portion protruding out of the second support.

5. The insulating framework according to claim 3, further comprising a step portion provided on the second support, wherein the step portion is located at the side of the protruding portion away from the wire slot.

6. The insulating framework according to claim 2, wherein:

the third support is provided with a plurality of auxiliary grooves, each auxiliary groove extending along the first direction, the plurality of auxiliary grooves are distributed along a second direction, and the first support, the third support and the second support are sequentially distributed along the second direction.

7. The insulating framework according to claim 6, wherein:

the edge of the inclined portion close to the bottom of the second support is approximately flush with the bottom of the auxiliary grooves; and/or the wall surface of the wire slot close to the terminal accommodating portion is approximately flush with the wall surface of the third support close to the wire slot.

8. The insulating framework according to claim 6, wherein:

the side of the first support facing the second support is provided with a cut, the cut is arranged close to the bottom of the first support, and along the first direction, the cut is located at two sides of the third support.

9. The insulating framework according to claim 8, wherein the side of the cut close to the top of the first support is flush with the top of the auxiliary grooves.

10. The insulating framework according to claim 2, further comprising:

a marker provided on at least one of the second support and the first support, wherein the marker corresponds to the width of the notch of the terminal accommodating portion and the width of the auxiliary groove of the third support.

11. The insulating framework according to claim 1, wherein the terminal accommodating portion further comprises:

a glue overflow table, wherein the glue overflow table is provided at the two sides of the accommodating groove along the first direction; and a lug boss provided on the glue overflow table, wherein the glue overflow groove is enclosed at least by the lug boss and the glue overflow table.

12. The insulating framework according to claim 11, wherein the lug boss comprises:

a first bump, provided at the side of the accommodating groove away from the wire slot, wherein the first bump is located at the side of the notch away from the first support; and a second bump, provided at the side of the accommodating groove close to the wire slot, wherein the glue overflow groove is enclosed by the second bump, the second support and the accommodating groove, and a gap is provided between the second bump and the accommodating groove.

13. The insulating framework according to claim 1, wherein:

the notch comprises a first channel and a second channel which are in communication, the first channel is located on the top of the second channel, and a side wall of the first channel is provided gradually expanding towards two sides of the first channel; and/or the width of the wire slot is greater than that of the notch.

14. A stator comprising:

a stator core, wherein the stator core comprises a plurality of block cores connected in sequence, the block cores comprise tooth portions, and a stator groove is enclosed by the tooth portions of two adjacent block cores;

the insulating framework according to claim 1, wherein the number of the insulating frameworks is multiple, the two ends of each block core are provided with the insulating frameworks, and the third support is disposed opposite to the tooth portions; and a winding, wherein the winding is wound around the tooth portions and the insulating frameworks.

15. The stator according to claim 14, wherein:

the winding comprises a plurality of coils, one of the coils is wound around one of the block cores and the insulating frameworks at the two ends of the block core, the coil comprises a wire head and a wire tail.

16. The stator according to claim 14, further comprising:

an insulating cover plate, wherein the insulating cover plate is provided at the side of the insulating framework away from the stator core, and the insulating cover plate is in buckling connection with the protruding portion of the insulating framework.

17. An insulating framework comprising:

a first support;

a second support, disposed opposite to the first support, wherein a terminal accommodating portion is provided at the side of the second support away from the first support;

the terminal accommodating portion comprises:

an accommodating groove for accommodating the crimp terminal, wherein along a first direction, a notch is provided in side walls of the accommodating groove disposed opposite to each other; and a glue overflow groove, wherein along the first direction, the glue overflow groove is located at least at one side of the accommodating groove, and the glue overflow groove is in communication with the notch; and a third support, wherein the third support is located between the first support and the second support and is connected to the first support and the second support.

18. The insulating framework according to claim 17, wherein the terminal accommodating portion further comprises:

a glue overflow table, wherein the glue overflow table is provided at two sides of the accommodating groove along the first direction; and a lug boss, provided on the glue overflow table, wherein the glue overflow groove is enclosed at least by the lug boss and the glue overflow table.

19. The insulating framework according to claim 18, wherein the lug boss comprises:

a first bump, wherein along the first direction, the first bump is provided at a first side of the accommodating groove and is located at the side of the notch away from the first support; and a second bump, wherein along the first direction, the second bump is provided at a second side of the accommodating groove, and the glue overflow groove is enclosed by the second bump, the second support, the accommodating groove and the glue overflow table, and a gap is provided between the second bump and the accommodating groove.

20. The insulating framework according to claim 17, wherein:

the notch comprises a first channel and a second channel which are in communication with each other, the first channel is located on the top of the second channel, and a side wall of the first channel is provided gradually expanding towards two sides of the first channel.

21. The insulating framework according to claim 17, further comprising:

a protruding portion provided at the side of the second support away from the first support, wherein along the first direction, the protruding portion and the terminal accommodating portion are arranged sequentially.

22. The insulating framework according to claim 21, wherein:

at least a portion of the top wall of the protruding portion inclines towards the bottom of the second support; and/or the length of the terminal accommodating portion protruding out of the second support is greater than the length of the protruding portion protruding out of the second support.

23. The insulating framework according to claim 21, further comprising:

a step portion provided on the second support, wherein the step portion is located at the side of the protruding portion away from the terminal accommodating portion.

24. The insulating framework according to claim 17, wherein:

the third support is provided with a plurality of auxiliary grooves, each of the auxiliary grooves extends along the first direction, the plurality of auxiliary grooves are distributed along a second direction, and the first support, the third support and the second support are sequentially distributed along the second direction.

25. The insulating framework according to claim 24, wherein:

the side of the first support facing the second support is provided with a cut, the cut is arranged close to the bottom of the first support, and along the first direction, the cut is located at two sides of the third support.

26. The insulating framework according to claim 25, wherein the side of the cut close to the top of the first support is flush with the top of the auxiliary grooves.

27. The insulating framework according to claim 24, further comprising:

a marker provided on at least one of the second support and the first support, wherein the marker corresponds to the width of the notch and the width of the auxiliary groove of the third support.

28. A stator comprising:

a crimp terminal, wherein the crimp terminal is provided in the accommodating groove;

a stator core, wherein the stator core comprises a plurality of block cores connected in sequence, the block cores comprise tooth portions, and a stator groove is enclosed by the tooth portions of two adjacent block cores;

the insulating framework according to claim 18, wherein the number of the insulating frameworks is multiple, the two ends of each of the block cores are provided with the insulating frameworks, and the third support is disposed opposite to the tooth portions; and a winding, wherein the winding is wound around the tooth portions and the insulating frameworks.

29. The stator according to claim 28, further comprising:

an insulating cover plate, provided at two sides of the insulating framework, wherein an avoiding groove is provided in the insulating cover plate, and the avoiding groove is arranged corresponding to the marker on the insulating framework and is used for avoiding the marker.

30. The stator according to claim 28, wherein:

a connecting protrusion is provided on the bottom of the second support, a groove is provided in the stator core, and the connecting protrusion is connected with the groove.

31. The stator according to claim 28, further comprising:

a marker provided on at least one of the second support and the first support.

* * * * *